United States Patent
Damnjanovic et al.

(10) Patent No.: US 9,450,732 B2
(45) Date of Patent: Sep. 20, 2016

(54) TRANSMISSION OF FEEDBACK INFORMATION FOR DATA TRANSMISSION ON MULTIPLE CARRIERS

(71) Applicant: QUALCOMM Incorporated, San Diego, CA (US)

(72) Inventors: Jelena Damnjanovic, Del Mar, CA (US); Juan Montojo, Nuremberg (DE); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/444,924

(22) Filed: Jul. 28, 2014

(65) Prior Publication Data
US 2014/0334429 A1 Nov. 13, 2014

Related U.S. Application Data

(62) Division of application No. 12/772,944, filed on May 3, 2010, now Pat. No. 8,792,427.

(60) Provisional application No. 61/175,382, filed on May 4, 2009.

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0028* (2013.01); *H04L 1/1861* (2013.01);
(Continued)

(58) Field of Classification Search
CPC ... H04B 7/0632; H04B 7/024; H04L 5/0007; H04L 5/0035; H04L 5/0091
See application file for complete search history.

(56) References Cited

U.S. PATENT DOCUMENTS 8,310,981 B2 11/2012 Damnjanovic et al.
8,477,734 B2 * 7/2013 Sambhwani et al. ......... 370/332
(Continued)

FOREIGN PATENT DOCUMENTS

EP 1257069 A1 11/2002
RU 2233033 C2 7/2004
(Continued)

OTHER PUBLICATIONS

Nokia et al: "L1 control signaling with carrier aggregation in LTE-Advanced", 3GPP Draft; R1-083730, 3rd Generation Partnership Project (3GPP), Mobile Competence Centre; 650, Route Des Lucioles; F-06921 Sophia-Antipolis Cedex; France, No. Prague, Czech Republic; Sep. 24, 2008, XP050317069, [retrieved on Sep. 24, 2008].*
(Continued)

*Primary Examiner* — Hassan Phillips
*Assistant Examiner* — Prenell Jones
(74) *Attorney, Agent, or Firm* — Paul Kuo

(57) ABSTRACT

Techniques for sending feedback information for multi-carrier operation are described. In an aspect, feedback information for data transmissions on multiple downlink carriers may be sent on at least one uplink resource determined based on at least one downlink resource used to send at least one downlink grant for the data transmissions. In another aspect, feedback information for data transmissions on multiple downlink carriers may be sent with reduced or no orthogonal spreading to enable more feedback information to be sent. In yet another aspect, feedback information for data transmissions on multiple downlink carriers may be sent with channel selection. A UE may send a transmission of at least one signal value on at least one resource to convey acknowledgement (ACK) information for data transmissions on multiple downlink carriers. The signal value(s) and resource(s) may be determined based on the content of the ACK information.

15 Claims, 13 Drawing Sheets

(51) Int. Cl.
  *H04L 5/06* (2006.01)
  *H04L 1/18* (2006.01)
(52) U.S. Cl.
  CPC .............. *H04L5/0094* (2013.01); *H04L 5/06* (2013.01); *H04L 1/18* (2013.01); *H04L 5/006* (2013.01); *H04L 5/0007* (2013.01)

(56) References Cited

U.S. PATENT DOCUMENTS

| | | | |
|---|---|---|---|
| 8,705,634 B2* | 4/2014 | Wegener | 375/241 |
| 2004/0042427 A1 | 3/2004 | Hottinen | |
| 2006/0274712 A1 | 12/2006 | Malladi et al. | |
| 2009/0245212 A1* | 10/2009 | Sambhwani et al. | 370/336 |
| 2010/0098012 A1 | 4/2010 | Bala et al. | |
| 2010/0103920 A1 | 4/2010 | Damnjanovic et al. | |
| 2010/0195614 A1 | 8/2010 | Nimbalker et al. | |
| 2010/0232382 A1 | 9/2010 | Gauvreau et al. | |
| 2010/0234037 A1 | 9/2010 | Terry et al. | |
| 2010/0254329 A1 | 10/2010 | Pan et al. | |
| 2010/0271970 A1 | 10/2010 | Pan et al. | |
| 2010/0272048 A1* | 10/2010 | Pan et al. | 370/329 |
| 2011/0110246 A1 | 5/2011 | Damnjanovic et al. | |
| 2011/0116455 A1 | 5/2011 | Damnjanovic et al. | |
| 2011/0116457 A1 | 5/2011 | Damnjanovic et al. | |
| 2011/0274071 A1 | 11/2011 | Lee et al. | |
| 2012/0002631 A1 | 1/2012 | Nishio et al. | |
| 2012/0113913 A1* | 5/2012 | Tiirola et al. | 370/329 |
| 2013/0329678 A1* | 12/2013 | Pan et al. | 370/329 |
| 2016/0043820 A1 | 2/2016 | Damnjanovic et al. | |

FOREIGN PATENT DOCUMENTS

| | | |
|---|---|---|
| RU | 2339186 C1 | 11/2008 |
| WO | 0035117 A2 | 6/2000 |
| WO | 2006052501 A1 | 5/2006 |
| WO | 2006052502 A2 | 5/2006 |
| WO | 2009034454 A2 | 3/2009 |
| WO | WO-2009055619 A1 | 4/2009 |
| WO | WO-2009055662 A2 | 4/2009 |
| WO | 2010106786 A1 | 9/2010 |

OTHER PUBLICATIONS

Ericsson: "Uplink transmission of ACK/NACK for E-Utra TDD", 3GPP Draft; R1-071894, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 17, 2007, XP050111798, [retrieved on Apr. 17, 2007].
Huawei: "PUCCH design for carrier aggregation" 3GPP Draft; R1-091275, 3rd Generation Partnership Project (3GPP), Mobile Competence Centre; 650, Route Des Lucioles; F-06921 Sophia-Antipolis Cedex; France, No. Seoul, Korea; Mar. 17, 2009, 8 pages, XP050338883 [retrieved on Mar. 17, 2009].
International Search Report and Written Opinion—PCT/US2010/033635, International Search Authority—European Patent Office—Jan. 11, 2011.
International Search Report and Written Opinion—PCT/US2010/033633—International Search Authority, European Patent Office,Jan. 25, 2011.
IPWIRELESS: "UL ACK/NACK signalling for E-UTRA TDD", 3GPP Draft; R1-071888, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 17, 2007, XP050111792, [retrieved on Apr. 17, 2007].
Mitsubishi Electric: "Uplink Multiple Access for LTE-Advanced", 3GPP Draft; R1-082776_ULMA, 3rd Generation Partnership Project (3GPP), Mobile Competence Centre ; 650, Route Des Lucioles ; F-06921 Sophia-Antipolis Cedex ; France, No. Jeju; Aug. 12, 2008, XP050316269, [retrieved on Aug. 12, 2008].
Motorola: "Control Signalling Design for Supporting Carrier Aggregation",3GPP Draft; R1-090792, 3rd Generation Partnership Project (3GPP), Mobile Competence Centre ; 650, Route Des Lucioles ; F-06921 Sophia-Antipolis Cedex ; France, No. Athens, Greece; Feb. 3, 2009, XP050318649, [retrieved on Feb. 3, 2009].
Motorola: "PDCCH Scrambling and ACK/NACK Detection", 3GPP Draft; R1-080746—PDCCH Scrambling and ACKNACK Detection, 3rd Generation Partnership Project (3GPP), Mobile Competence Centre ; 650, Route Des Lucioles ; F-06921 Sophia-Antipolis Cedex; France, vol. RAN WGI, No. Sorrento, Italy; Feb. 15, 2008, 3 Pages, XP050109232, [retrieved on Feb. 15, 2008].
NEC Group: "PUCCH allocation for ACK/NACK transmission", 3GPP Draft; R1-074169, 3rd Generation Partnership Project (3GPP), Mobile Competence Centre ; 650, Route Des Lucioles ; F-06921 Sophia-Antipolis Cedex ; France, vol. RAN WGI, No. Shanghai, China; Oct. 2, 2007, XP050107701, [retrieved on Oct. 2, 2007].
Nokia et al., "L1 control signaling with carrier aggregation in LTE-Advanced", 3GPP Draft; R1-083730, 3rd Generation Partnership Project (3GPP), Mobile Competence Centre; 650, Route Des Lucioles; F-06921 Sophia-Antipolis Cedex; France, No. Prague, Czech Republic; Sep. 24, 2008, 7 pages, XP050317069, [retrieved on Sep. 24, 2008].
QUALCOMM Europe: "Open issues on details in support of MIMO (FDD) for Rel-7", 3GPP Draft; R1-062440, 3rd Generation Partnership Project (3GPP), Mobile Competence Centre ; 650, Route Des Lucioles ; F-06921 Sophia-Antipolis Cedex ; France, vol. RAN WG1, No. Tallinn; Sep. 2, 2006, XP050102951, [retrieved on Sep. 2, 2006].
QUALCOMM Europe: "UL ACK/NACK assignment procedure", 3GPP Draft; R1-083176, 3rd Generation Partnership Project (3GPP), Mobile Competence Centre ; 650, Route Des Lucioles ; F-06921 Sophia-Antipolis Cedex ; France, No. Jeju; Aug. 12, 2008, XP050316608, [retrieved on Aug. 12, 2008].
QUALCOMM Europe: "UL HARQ Feedback for Multicarrier Operation", 3GPP Draft; R1-092709 UL-ACK MC, 3rd Generation Partnership Project (3GPP), Mobile Competence Centre ; 650, Route Des Lucioles ; F-06921 Sophia-Antipolis Cedex ; France, No. Los Angeles, USA; Jun. 24, 2009, XP050351180, [retrieved on Jun. 24, 2009].
Samsung: "LTE uplink ACK channel for downlink MCW MIMO support", 3GPP Draft; R1-071565, SRD Generation Partnership Project (3GPP), Mobile Competence Centre ; 650, Route Des Lucioles ; F-06921 Sophia-Antipolis Cedex ; France, vol. RAN WGI, No. St. Julian; Apr. 3, 2007, XP050105496, [retrieved on Apr. 3, 2007].
Samsung: "Time vs. frequency domain realization of SC-FDMA transmissions", 3GPP Draft; R1-050881 SC-FDMA Realization, 3rd Generation Partnership Project (3GPP), Mobile Competence Centre ; 650, Route Des Lucioles ; F-06921 Sophia-Antipolis Cedex ; France, vol. RAN WGI, No. London, UK; Aug. 25, 2005, XP050100506, [retrieved on Aug. 25, 2005].
Samsung: "UL ACK/NAK Transmission in LTE-A", 3GPP Draft; R1-091238 UL ACK NAK, 3rd Generation Partnership Project (3GPP), Mobile Competence Centre ; 650, Route Des Lucioles ; F-06921 Sophia-Antipolis Cedex ; France, No. Seoul, Korea; Mar. 18, 2009, XP050338852, [retrieved on Mar. 18, 2009].
Taiwan Search Report—TW099114299—TIPO—Oct. 6, 2013.
Taiwan Search Report—TW099114303—TIPO—May 15, 2014.
Texas Instruments: "Issues on Carrier Aggregation for Advanced E-UTRA", 3GPP Draft; R1-084443, 3rd Generation Partnership Project (3GPP), Mobile Competence Centre ; 650, Route Des Lucioles ; F-06921 Sophia-Antipolis Cedex ; France, No. Prague, Czech Republic; Nov. 5, 2008, XP050317701, [retrieved on Nov. 5, 2008].
ZTE: "Uplink Control Channel Design for LTE-Advanced", 3GPP Draft; R1-091427 Uplink Control, Channel Design for LTE-A, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009 , XP050339006, [retrieved on Mar. 17, 2009].
ZTE: "Uplink Control Channel Design for LTE-Advanced",3GPP Draft; R1-090629 Uplink Control Channel Design for LTE-A, 3rd

(56) References Cited

OTHER PUBLICATIONS

Generation Partnership Project (3GPP), Mobile Competence Centre ; 650, Route Des Lucioles ; F-06921 Sophia-Antipolis Cedex ; France, No. Athens, Greece; Feb. 3, 2009, XP050318510, [retrieved on Feb. 3, 2009].

LG Electronics: "Discussion on Signalling for Reconfiguration," 3GPP TSG-RAN WG2 #59bis R2-074232, Oct. 2, 2007, pp. 1-6 URL, http://www.3gpp.org/ftp/tsg_ran/WG2_RL2/TSGR2_59bis/Docs/R2-074232.zip.

* cited by examiner

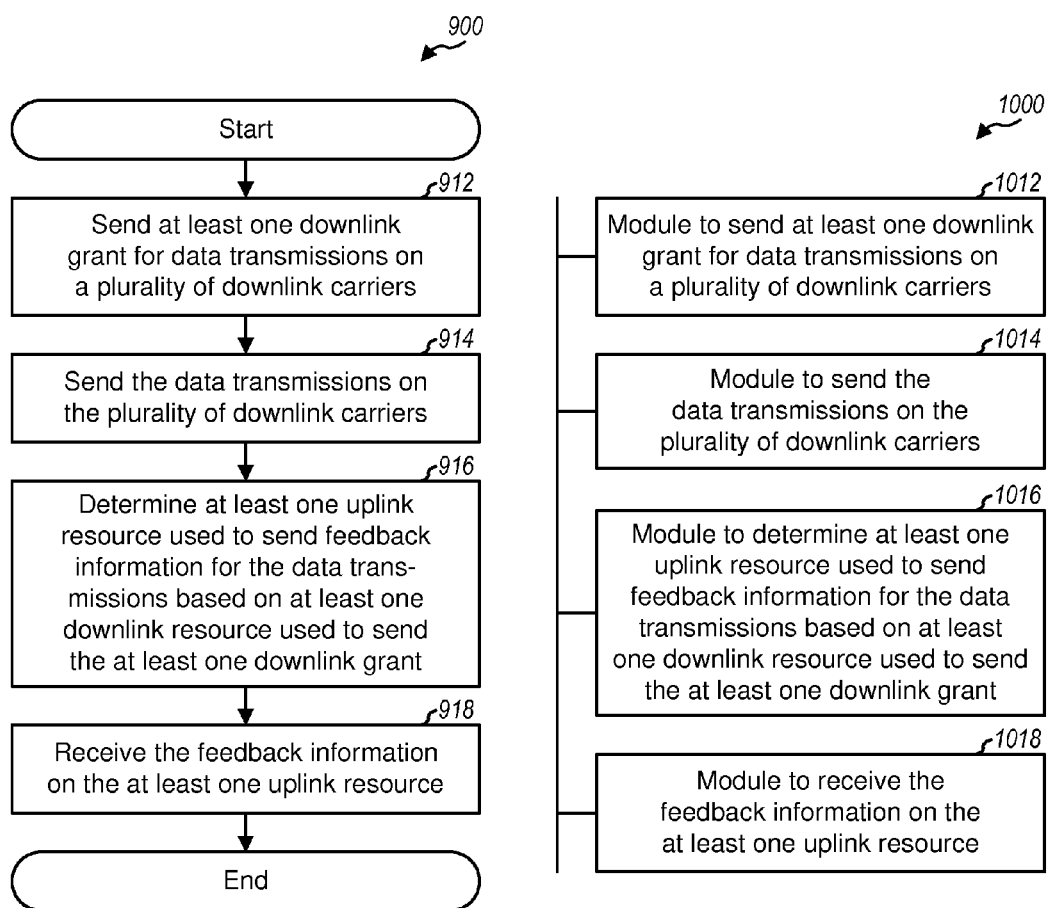

TRANSMISSION OF FEEDBACK INFORMATION FOR DATA TRANSMISSION ON MULTIPLE CARRIERS

The present application is a divisional application of, and claims priority to, U.S. application Ser. No. 12/772,944, entitled, "TRANSMISSION OF FEEDBACK INFORMATION FOR DATA TRANSMISSIONS ON MULTIPLE CARRIERS," filed May 3, 2010, which further claims priority to provisional U.S. Application Ser. No. 61/175,382, entitled "UPLINK HYBRID AUTOMATIC REPEAT REQUEST (HARQ) FEEDBACK IN MULTICARRIER OPERATION," filed May 4, 2009, all of which are assigned to the Assignee hereof and hereby expressly incorporated by reference herein.

BACKGROUND

I. Field

The present disclosure relates generally to communication, and more specifically to techniques for sending feedback information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless system may support operation on multiple carriers. A carrier may refer to a range of frequencies used for communication and may be associated with certain characteristics. For example, a carrier may carry synchronization signals, or may be associated with system information describing operation on the carrier, etc. A carrier may also be referred to as a channel, a frequency channel, etc. A base station may send data on one or more carriers on the downlink to a UE. The UE may send feedback information on the uplink to support data transmission on the downlink. It may be desirable to efficiently send the feedback information on the uplink.

SUMMARY

Techniques for sending feedback information in a wireless communication system supporting multiple carriers on the downlink (or downlink carriers) and one or more carriers on the uplink (or uplink carriers) are described herein. In an aspect, feedback information for data transmissions on a plurality of downlink carriers may be sent on uplink resources determined based on downlink resources used to send downlink grants for the data transmissions. In one design, a UE may receive at least one downlink grant, receive data transmissions on a plurality of downlink carriers based on the at least one uplink grant, and determine feedback information for the data transmissions. The feedback information may comprise acknowledgement (ACK) information, channel quality indicator (CQI) information, and/or some other information. The UE may determine at least one uplink resource to use to send the feedback information based on at least one downlink resource used to send the at least one downlink grant. The UE may then send the feedback information on the at least one uplink resource.

In another aspect, feedback information for data transmissions on a plurality of downlink carriers may be sent with reduced or no orthogonal spreading to enable more feedback information to be sent. In one design, a UE may receive data transmissions on a plurality of downlink carriers and may determine feedback information for the data transmissions. The UE may send the feedback information without orthogonal spreading or with reduced orthogonal spreading. Feedback information for data transmission on a single downlink carrier may be sent with orthogonal spreading using an orthogonal sequence of a particular length (e.g., of four). The reduced orthogonal spreading may use an orthogonal sequence of a shorter length (e.g., of two).

In yet another aspect, feedback information for data transmissions on a plurality of downlink carriers may be sent with channel selection. In one design, a UE may receive data transmissions on a plurality of downlink carriers and may determine acknowledgement (ACK) information for the data transmissions. The UE may determine at least one resource to use to send the ACK information from among a plurality of resources based on the content of the ACK information (e.g., ACKs and/or NACKs). The UE may also determine at least one signal value to send based on the content of the ACK information. The UE may then send a transmission of the at least one signal value on the at least one resource to convey the ACK information.

A base station may perform complementary processing to recover the feedback information sent by the UE. Various aspects and features of the disclosure are described in further detail below.

BRIEF DESCRIPTION OF THE DRAWINGS

FIGS. 9 and 10 show a process and an apparatus, respectively, for receiving feedback information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
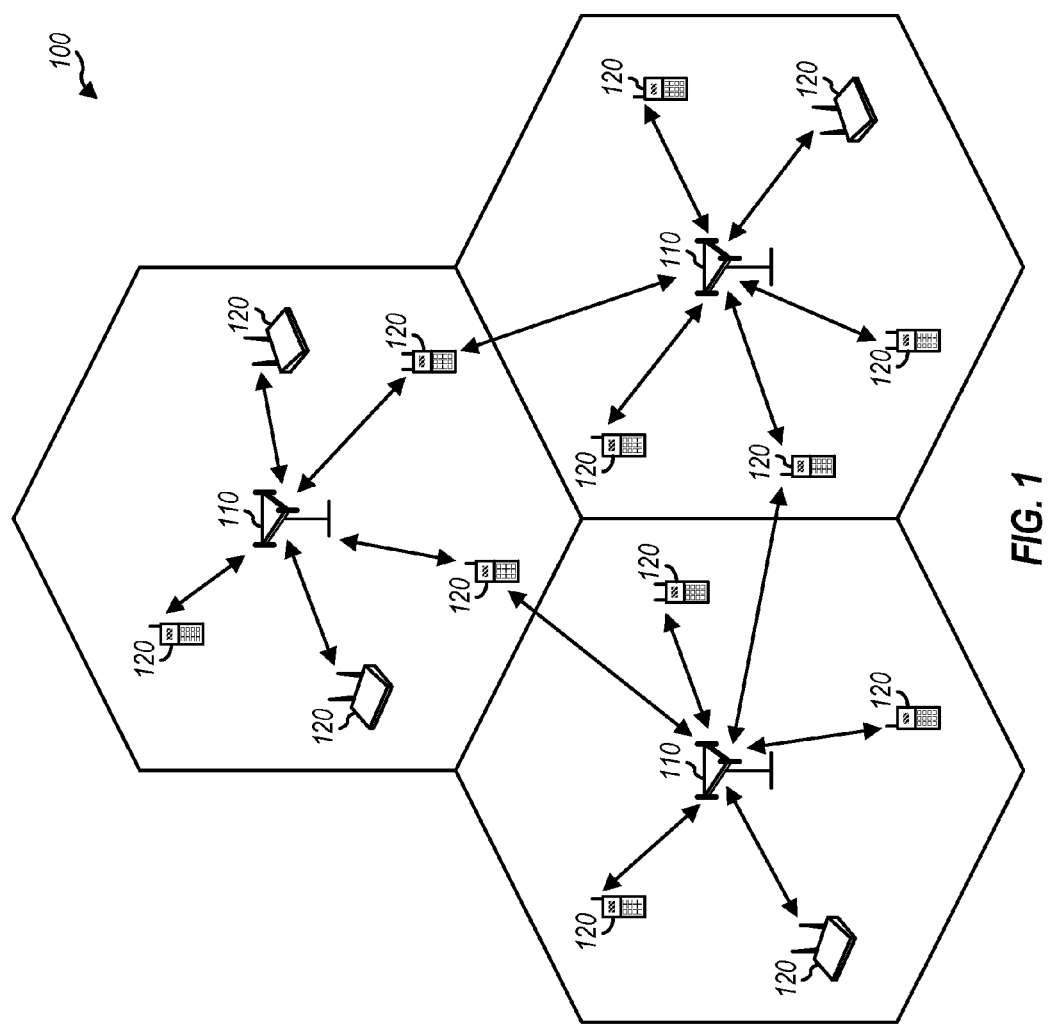
FIG. 1 shows a wireless communication system.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a Node B, a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

The system may support hybrid automatic retransmission (HARQ) in order to improve reliability of data transmission. For HARQ, a transmitter may send a transmission of a transport block (or packet) and may send one or more additional transmissions, if needed, until the transport block is decoded correctly by a receiver, or the maximum number of transmissions has been sent, or some other termination condition is encountered. After each transmission of the transport block, the receiver may send an acknowledgement (ACK) if the transport block is decoded correctly or a negative acknowledgement (NACK) if the transport block is decoded in error. The transmitter may send another transmission of the transport block if a NACK is received and may terminate transmission of the transport block if an ACK is received. ACK information may comprise ACK and/or NACK and may also be referred to as HARQ feedback.

Figure 2:
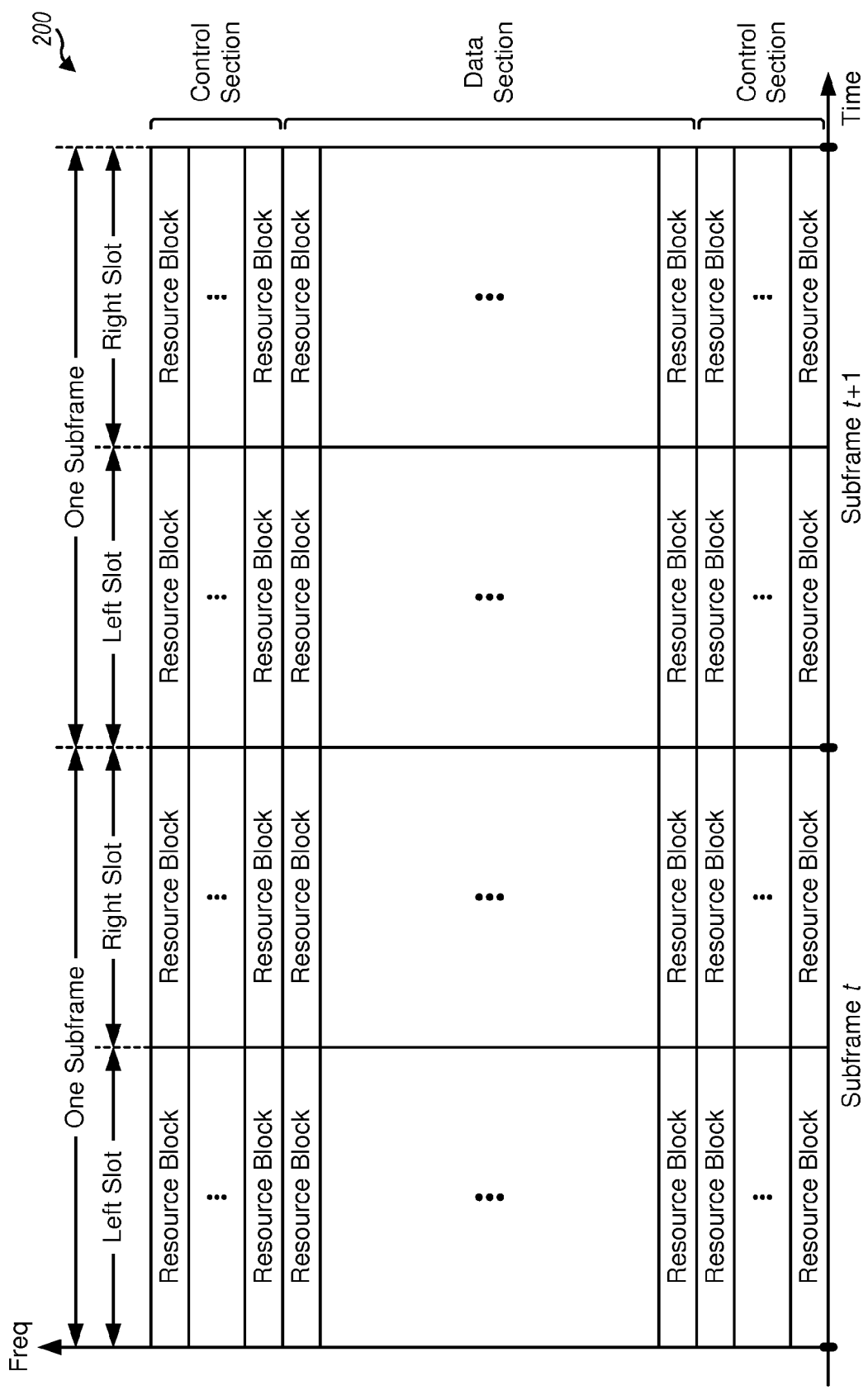
FIG. 2 shows an exemplary transmission structure.

FIG. 2 shows an exemplary transmission structure 200 that may be used for the downlink and uplink. The transmission timeline for each link may be partitioned into units of subframes. A subframe may have a predetermined duration, e.g., one millisecond (ms), and may be partitioned into two slots. Each slot may include six symbol periods for an extended cyclic prefix or seven symbol periods for a normal cyclic prefix.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

For each of the downlink and uplink, multiple resource blocks may be defined in each slot with the $N_{FFT}$ total subcarriers. Each resource block may cover K subcarriers (e.g., K=12 subcarriers) in one slot. The number of resource blocks in each slot may be dependent on the system bandwidth and may range from 6 to 110. On the uplink, the available resource blocks may be divided into a data section and a control section. The control section may be formed at the two edges of the system bandwidth (as shown in FIG. 2) and may have a configurable size. The data section may include all resource blocks not included in the control section. The design in FIG. 2 results in the data section including contiguous subcarriers.

A UE may be assigned resource blocks in the control section to send control information to an eNB. The UE may also be assigned resource blocks in the data section to send data and possibly control information to the eNB. The control information may comprise feedback information, scheduling request, etc. The feedback information may comprise ACK information, CQI information, etc. The UE may send data and/or control information at any given moment. Furthermore, the UE may send ACK information, CQI information, and/or other control information at any given moment. The UE may send only data or both data and control information on a Physical Uplink Shared Channel (PUSCH) on resource blocks in the data section. The UE may send only control information on a Physical Uplink Control Channel (PUCCH) on resource blocks in the control section. Different types of control information may be combined and sent together in order to maintain a single-carrier waveform. For example, ACK information may be sent alone on ACK resources, or with CQI information on CQI resources.

A number of PUCCH formats may be supported, e.g., as shown in Table 1. PUCCH formats 1a and 1b may be used to send one or two bits (e.g., of ACK information) in a single modulation symbol. PUCCH format 2 may be used to send 20 bits (e.g., of CQI or ACK information) in 10 modulation symbols. PUCCH formats 2a and 2b may be used to send 21 or 22 bits (e.g., of both ACK and CQI information) in 11 modulation symbols.

TABLE 1

PUCCH Formats

| PUCCH Format | Modulation Scheme | Number of Bits/Subframe | Number of Modulation Symbols/Subframe |
|---|---|---|---|
| 1a | BPSK | 1 | 1 |
| 1b | QPSK | 2 | 1 |
| 2 | QPSK | 20 | 10 |
| 2a | QPSK + BPSK | 21 | 11 |
| 2b | QPSK + QPSK | 22 | 11 |

Figure 3:
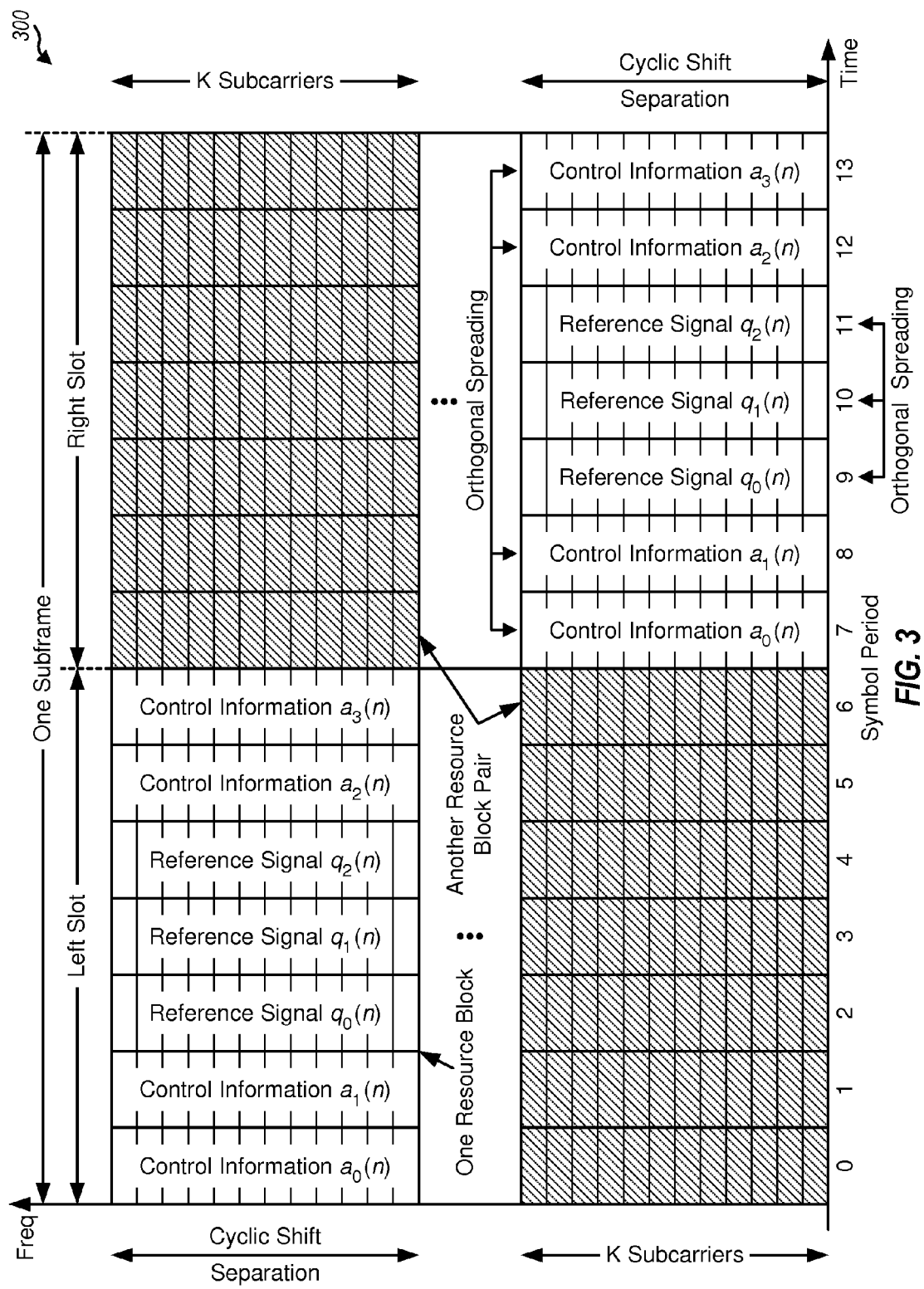
FIG. 3 shows a structure for sending ACK information.

FIG. 3 shows a structure 300 for sending ACK information on the PUCCH for a case in which each slot includes seven symbol periods. For ACK structure 300, a resource block includes four symbol periods for ACK information and three symbol periods for a reference signal. In the left slot, ACK information may be sent in symbol periods 0, 1, 5 and 6, and a reference signal may be sent in symbol periods 2, 3 and 4. In the right slot, ACK information may be sent in symbol periods 7, 8, 12 and 13, and a reference signal may be sent in symbol periods 9, 10 and 11. ACK information and reference signal may also be sent in other manners on a pair of resource blocks.

A UE may process ACK information as follows. The UE may map one or two bits of ACK information to a modulation symbol d(0) based on BPSK or QPSK. The UE may then modulate and spread a reference signal sequence with the modulation symbol, as follows:

$$a_n(k) = w(n) \cdot d(0) \cdot r(k), \text{ for } k=0, \ldots, K-1 \text{ and } n=0, \ldots, N-1, \quad \text{Eq (1)}$$

where r(k) is a reference signal sequence, w(n) is an orthogonal sequence used to spread ACK information, $a_n(k)$ is the n-th data sequence for ACK information, and N is the number of symbol periods in which ACK information is sent.

As shown in equation (1), the reference signal sequence may be modulated with modulation symbol d(0) to obtain a modulated sequence. The modulated sequence may then be spread with orthogonal sequence w(n) to obtain N data sequences, where N=4 in FIG. 3. The N data sequences may be sent in N symbol periods in each resource block, e.g., as shown in FIG. 3.

The UE may generate the reference signal for ACK information, as follows:

$$q_i(k) = w(i) \cdot r(k), \text{ for } k=0, \ldots, K-1 \text{ and } i=0, \ldots, L-1, \quad \text{Eq (2)}$$

where $q_i(k)$ is the i-th pilot sequence for ACK information, and

L is the number of symbol periods in which the reference signal is sent.

As shown in equation (2), the reference signal sequence may be spread with orthogonal sequence w(i) to obtain L pilot sequences, where L=3 in FIG. 3. The L pilot sequences may be sent in L symbol periods in each resource block, e.g., as shown in FIG. 3.

A number of reference signal sequences may be defined based on different cyclic shifts of a base sequence. The base sequence may be a Zadoff-Chu sequence, a pseudo-random sequence, etc. Up to K different reference signal sequences may be obtained with up to K different cyclic shifts of the base sequence, where K is the length of the base sequence. Only a subset of the K reference signal sequences may be selected for use, and the selected reference signal sequences may be spaced apart as much as possible in terms of their cyclic shifts. The reference signal sequences may also be referred to as different cyclic shifts of the base sequence.

The system may support multi-carrier operation with multiple carriers on the downlink and one or more carriers on the uplink. A carrier used for the downlink may be referred to as a downlink carrier, and a carrier used for the uplink may be referred to as an uplink carrier. An eNB may send data transmission on one or more downlink carriers to a UE. The UE may send feedback information on one or more uplink carriers to the eNB. For clarity, much of the description below is for the case in which the feedback information comprises HARQ feedback. Data transmission and HARQ feedback may be sent in various manners.

Figure 4A:
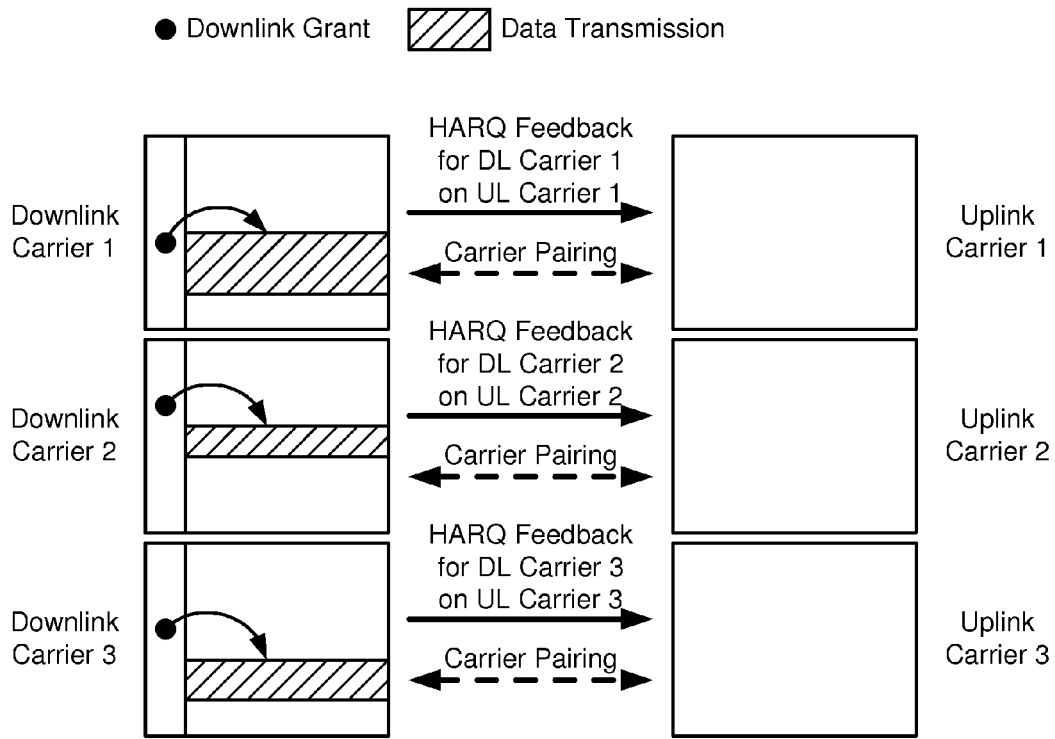
FIG. 4A shows one-to-one feedback mapping.

FIG. 4A shows a design of one-to-one HARQ feedback mapping with symmetric downlink/uplink carrier configuration. In this design, each downlink (DL) carrier is paired with a corresponding uplink (UL) carrier. An eNB may send data transmission on a Physical Downlink Shared Channel (PDSCH) on a particular downlink carrier to a UE. The UE may send HARQ feedback on a corresponding uplink carrier to the eNB.

In the example shown in FIG. 4A, the eNB may send data transmissions on three downlink carriers 1, 2 and 3 to the UE. The eNB may also send three downlink grants for the data transmissions on the three downlink carriers, one downlink grant for the data transmission on each downlink carrier. Each downlink grant may include pertinent parameters (e.g., modulation and coding scheme, resource blocks, etc.) used for data transmission to the UE. The UE may receive and decode the data transmission on each downlink carrier based on the downlink grant for that data transmission and may send HARQ feedback on the corresponding uplink carrier.

For one-to-one HARQ feedback mapping, HARQ feedback for a single downlink carrier may be sent on a single uplink carrier. A downlink grant may be sent on a downlink carrier used for data transmission or on a different downlink carrier. In one design, HARQ feedback may be sent on an uplink carrier paired with the downlink carrier on which the downlink grant is sent, regardless of where the data transmission is sent. The uplink carrier used for HARQ feedback may then be paired with the downlink carrier on which a downlink grant is sent. Furthermore, HARQ feedback may be sent on an ACK resource identified based on downlink resource used to send the downlink grant, as described below.

Figure 4B:
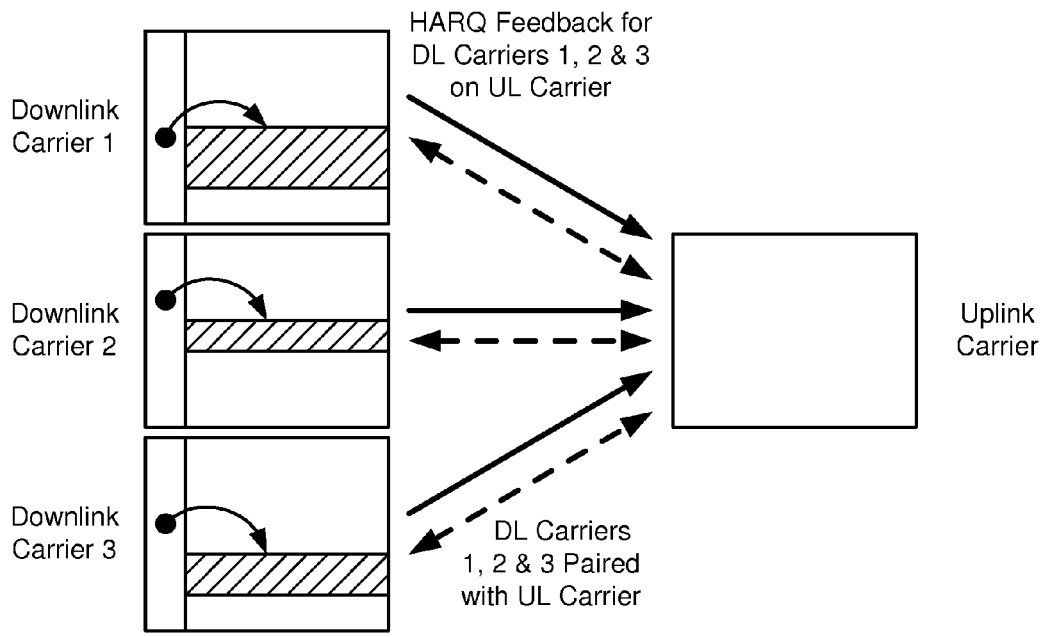
FIG. 4B shows many-to-one feedback mapping.

FIG. 4B shows a design of many-to-one HARQ feedback mapping with asymmetric downlink/uplink carrier configuration. In this design, all downlink carriers may be paired with a single uplink carrier. An eNB may send data transmission on one or more downlink carriers to a UE. The UE may send HARQ feedback on the uplink carrier to the eNB.

Figure 4C:
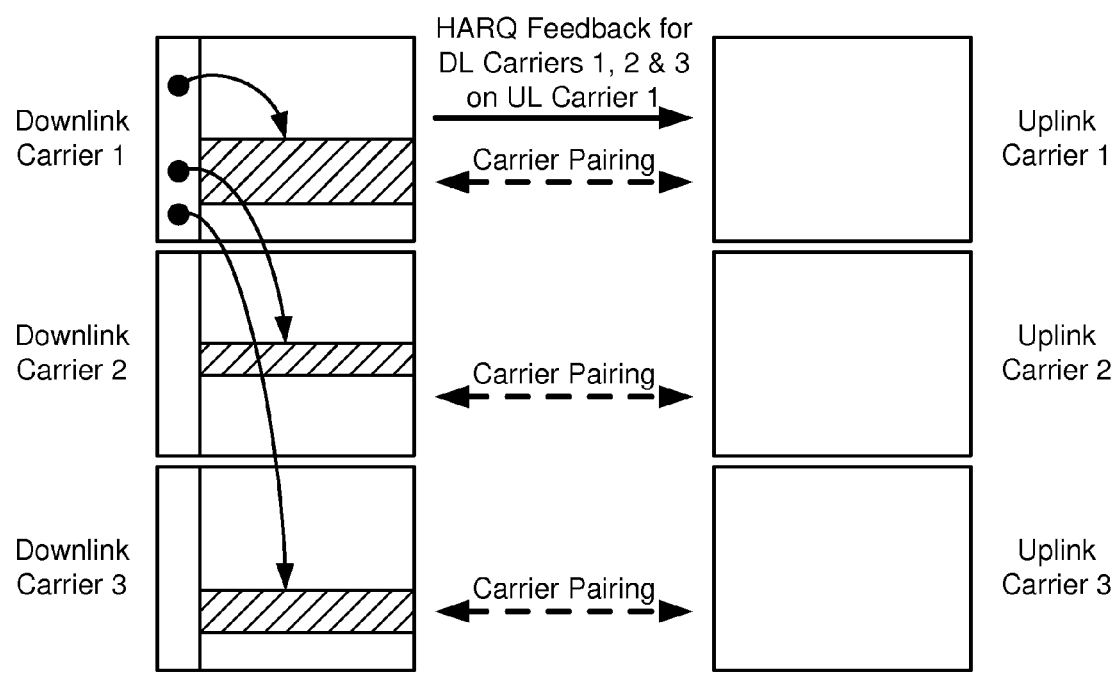
FIG. 4C shows another many-to-one feedback mapping.

FIG. 4C shows a design of many-to-one HARQ feedback mapping with symmetric downlink/uplink carrier configuration and cross-carrier control operation. Each downlink carrier may be paired with a corresponding uplink carrier. An eNB may send data transmission on a particular downlink carrier to a UE. The UE may send HARQ feedback on an uplink carrier that may or may not be paired with the downlink carrier.

In the example shown in FIG. 4C, the eNB may send data transmissions on three downlink carriers 1, 2 and 3 to the UE. The eNB may also send either three per-carrier downlink grants or a single multi-carrier downlink grant for the data transmissions on the three downlink carriers. A per-carrier downlink grant may convey pertinent parameters for data transmission on a single downlink carrier. A multi-carrier downlink grant may convey pertinent parameters for data transmissions on multiple downlink carriers. The UE may receive and decode the data transmissions on all downlink carriers and may send HARQ feedback on a designated uplink carrier.

In general, for many-to-one HARQ feedback mapping (e.g., as shown in FIGS. 4B and 4C), HARQ feedback for multiple downlink carriers may be sent on a single uplink carrier. HARQ feedback for a given downlink carrier may be sent on an uplink carrier that may or may not be paired with the downlink carrier. Many-to-one HARQ feedback mapping may be used for (i) asymmetric downlink/uplink carrier configuration where the number of downlink carriers is larger than the number of uplink carriers and/or (ii) cross-carrier control operation regardless of the downlink/uplink carrier configuration.

An eNB may send zero or more transmissions of downlink control information (DCI) on each downlink carrier. Each DCI may be sent on one or more Control Channel Elements (CCEs) for a Physical Downlink Control Channel (PDCCH), which may be sent in the first M symbol periods of a subframe, where M may be 1, 2 or 3. Each CCE may include nine resource element groups (REGs), and each REG may include four resource elements. Each resource element may correspond to one subcarrier in one symbol period and may be used to send one modulation symbol. A DCI may carry a per-carrier downlink grant or a multi-carrier downlink grant for a UE. The UE may send HARQ feedback on ACK resources determined based on the first CCE used to send DCI carrying a downlink grant for the UE, as described below.

In an aspect, HARQ feedback may be sent on an uplink carrier that may or may not be paired with a downlink carrier on which data transmission is sent. A scheme may be used to determine which uplink carrier to use to send HARQ feedback for data transmission on a given downlink carrier in multi-carrier operation.

In a first design, HARQ feedback may be sent on a designated uplink carrier based on many-to-one HARQ feedback mapping, e.g., as shown in FIG. 4B or 4C. The designated uplink carrier may be conveyed in various manners. In one design, DCI for data transmissions on multiple downlink carriers may be sent on a single downlink carrier, e.g., as shown in FIG. 4C. HARQ feedback for all downlink carriers may then be sent on the uplink carrier that is paired with the downlink carrier used to send the DCI. In another design, the designated uplink carrier used to send HARQ feedback may be signaled to a specific UE, e.g., via Radio Resource Control (RRC) signaling, or DCI, or some other mechanism.

In a second design, HARQ feedback may be sent based on either uplink-downlink carrier pairing or a designated uplink carrier. Which HARQ feedback mapping to use may be configurable and may be conveyed in various manners. In one design, a flag may be used to indicate whether to send HARQ feedback using uplink-downlink carrier pairing or a designated uplink carrier. The flag may be set to (i) a first value (e.g., 0) to indicate that HARQ feedback should be sent on an uplink carrier paired with a downlink carrier or (ii) a second value (e.g., 1) to indicate that HARQ feedback should be sent on a designated uplink carrier.

The flag may be sent in various manners. In one design, the flag may be broadcast in system information to all UEs. In another design, the flag may be sent to a specific UE, e.g., via RRC signaling, or DCI, or some other mechanism. A new UE that supports the flag may send HARQ feedback on the paired uplink carrier or the designated uplink carrier, as indicated by the flag. A legacy UE that does not support the flag may send HARQ feedback on the paired uplink carrier.

In another aspect, HARQ feedback for multiple downlink carriers (which may also be referred to as multi-carrier HARQ feedback) may be sent on at least one uplink carrier using SC-FDMA. For SC-FDMA, modulation symbols may be transformed from the time domain to the frequency domain with a discrete Fourier transform (DFT) to obtain frequency-domain symbols. The frequency-domain symbols may be mapped to subcarriers used for transmission, and zero symbols with signal value of zero may be mapped to subcarriers not used for transmission. The mapped symbols may then be transformed from the frequency domain to the time domain with an inverse fast Fourier transform (IFFT) to obtain time-domain samples for an SC-FDMA symbol. SC-FDMA may thus be characterized by modulation symbols being sent in the time domain and converted to the frequency domain with DFT prior to mapping to subcarriers. SC-FDMA is different from OFDM, which may be characterized by modulation symbols being sent in the frequency domain and mapped directly to subcarriers, without going through a DFT. HARQ feedback may be sent with SC-FDMA in various manners.

In one design, HARQ feedback for multiple downlink carriers may be sent on an uplink carrier based on relaxed SC-FDMA, which may be one version of SC-FDMA. For relaxed SC-FDMA, HARQ feedback for different downlink carriers may be sent on different ACK resources such that a single-carrier waveform may not be maintained for the uplink transmission. A single-carrier waveform may be maintained if an uplink transmission is sent on contiguous subcarriers and if a single reference signal sequence is used for spreading across frequency.

In a first design of relaxed SC-FDMA, different downlink carriers may be mapped to different frequency regions of an uplink carrier, one frequency region for each downlink carrier. Each frequency region may correspond to a different set of one or more resource blocks. The different frequency regions may be defined by different frequency offsets from a reference frequency, which may be the boundary between the data and control regions.

Per-carrier downlink grants may be sent for data transmissions on multiple downlink carriers. In this case, HARQ feedback for data transmission on each downlink carrier may be sent on ACK resource determined based on the first CCE in which the corresponding per-carrier downlink grant is sent.

A multi-carrier downlink grant may also be sent for data transmissions on multiple downlink carriers. HARQ feedback may be sent in various manners for this case. In one design, HARQ feedback for each downlink carrier may be sent on ACK resource determined based on (i) the first CCE in which DCI carrying the multi-carrier downlink grant is sent and (ii) the downlink carrier on which data transmission is sent. For example, the first CCE may determine the orthogonal sequence and the reference signal sequence, and the downlink carrier on which the data transmission is sent may determine the frequency region. In this design, the first CCE used for the DCI carrying the multi-carrier downlink grant should not be reused as the first CCE on another downlink carrier for DCI carrying another downlink grant for another UE in order to avoid multiple downlink grants being mapped to the same ACK resource. In another design, HARQ feedback for each downlink carrier may be sent on ACK resource determined based on the CCEs in which the DCI carrying the multi-carrier downlink grant is sent. The DCI carrying the multi-carrier downlink grant may be for data transmissions on Q downlink carriers, where Q is greater than one. HARQ feedback for the Q downlink carriers may be sent on Q ACK resources corresponding to Q CCEs starting with the first CCE in which the DCI carrying the multi-carrier downlink grant is sent. Each CCE may be mapped to different ACK resource. Q CCEs may be reserved or used to send the DCI carrying the multi-carrier downlink grant to ensure a sufficient number of ACK resources for multi-carrier HARQ feedback.

In a second design of relaxed SC-FDMA, a shared frequency region on an uplink carrier may be used to send HARQ feedback for multiple downlink carriers. Per-carrier downlink grants may be sent for data transmissions on multiple downlink carriers. HARQ feedback for data transmission on each downlink carrier may be sent on ACK resource determined based on the first CCE used for DCI carrying a downlink grant for the data transmission on that downlink carrier. The first CCE used for DCI on one carrier should not be reused as the first CCE for DCI on another carrier in order to avoid multiple downlink grants mapping to the same ACK resource. A scheduler may satisfy this restriction by sending DCIs on appropriate CCEs. Alternatively, a multi-carrier downlink grant may be sent for data transmissions on multiple (Q) downlink carriers. In this case, Q CCEs may be reserved or used for DCI carrying the multi-carrier downlink grant to provide Q ACK resources for HARQ feedback for the Q downlink carriers.

Figure 5:
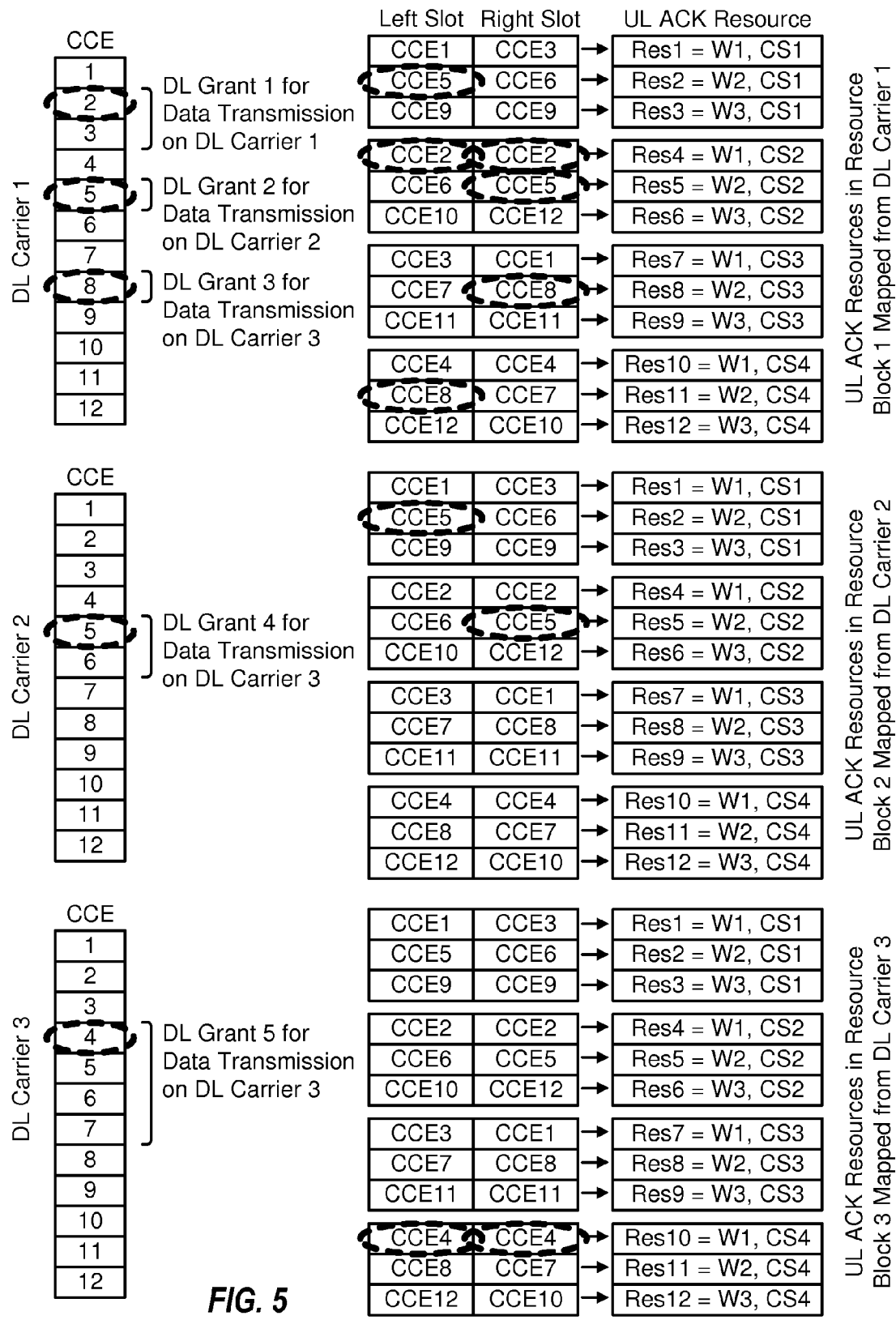
FIG. 5 shows transmission of feedback information with relaxed SC-FDMA.

FIG. 5 shows a design of sending HARQ feedback for multiple downlink carriers with relaxed SC-FDMA using different frequency regions of an uplink carrier. In the example shown in FIG. 5, three downlink carriers may be used to send downlink grants and data transmissions, and one uplink carrier may be used to send HARQ feedback. Each downlink carrier may include 12 CCEs with indices of 1 through 12. The three downlink carriers may thus include a total of 36 CCEs, which may be mapped to 36 ACK indices.

Each CCE for each downlink carrier may be mapped to one ACK resource in the left slot and one ACK resource in the right slot of a subframe. Each ACK resource may be associated with a specific orthogonal sequence denoted as Wx, a specific reference signal sequence denoted as CSy, and a specific resource block denoted as RBz, where x, y and z may be indices for orthogonal sequence, reference signal sequence, and resource block, respectively. Each ACK resource may thus be identified by a (Wx, CSy, RBz) tuple. For the example shown in FIG. 5, 12 ACK resources denoted as Res1 through Res12 may be defined for a given resource block with four reference signal sequences CS1 through CS4 and three orthogonal sequences W1 through W3. The four reference signal sequences may correspond to four different (e.g., one zero and three non-zero) cyclic shifts of the base sequence. The three orthogonal sequences may be different Walsh sequences of length four for the case in which HARQ feedback is sent in four symbol periods, as shown in FIG. 3.

A total of 36 ACK resources may be defined with three resource blocks RB1, RB2 and RB3 in each slot. The 12 CCEs for downlink carrier 1 may be mapped to the 12 ACK resources in resource block RB1. The 12 CCEs for downlink carrier 2 may be mapped to the 12 ACK resources in resource block RB2. The 12 CCEs for downlink carrier 3 may be mapped to the 12 ACK resources in resource block RB3. The CCE mapped to each ACK resource is shown in FIG. 5. For example, CCE1 for downlink carrier 1 may be mapped to ACK resource Res1 in the left slot and to ACK resource Res7 in the right slot in resource block 1.

FIG. 5 shows a design in which the 12 CCEs for each downlink carrier are assigned indices of 1 through 12. In another design, the CCEs for all downlink carriers mapped to the same uplink carrier may be assigned unique indices based on common CCE numbering across all of these downlink carriers. For example, if the three downlink carriers in FIG. 5 are mapped to the same uplink carrier, then the 12 CCEs for downlink carrier 1 may be assigned indices 1 through 12, the 12 CCEs for downlink carrier 2 may be assigned indices 13 through 24, and the 12 CCEs for downlink carrier 3 may be assigned indices 25 through 36. The use of the common CCE numbering may avoid collisions when HARQ feedback for multiple downlink carriers are mapped to the same uplink carrier.

In the example shown in FIG. 5, five per-carrier downlink grants are sent for data transmissions on downlink carriers 1, 2 and 3. Each downlink grant is sent in DCI on one or more CCEs of one downlink carrier. HARQ feedback for data transmission on each downlink carrier is sent on ACK resource determined based on the first CCE used for the DCI carrying the downlink grant for the data transmission.

For example, DCI carrying downlink grant 1 is sent in CCEs 2 and 3 of downlink carrier 1. Downlink grant 1 conveys parameters for data transmission on downlink carrier 1. HARQ feedback for this data transmission is sent on ACK resources mapped to CCE 2, which is the first CCE used for the DCI carrying downlink grant 1. In particular, HARQ feedback is sent on ACK resource Res4 in the left slot and also on ACK resource Res4 in the right slot, as shown in FIG. 5. DCI carrying downlink grant 2 is sent in CCE 5 of downlink carrier 1, and downlink grant 2 conveys parameters for data transmission on downlink carrier 2. HARQ feedback for this data transmission is sent on ACK resource Res2 in the left slot and on ACK resource Res5 in the right slot, which are mapped to CCE 5 corresponding to the first CCE used for the DCI carrying downlink grant 2. Downlink grants and HARQ feedback for other data transmissions are shown in FIG. 5.

In another design, HARQ feedback for multiple downlink carriers may be sent on an uplink carrier based on strict SC-FDMA, which may be another version of SC-FDMA. For strict SC-FDMA, HARQ feedback for different downlink carriers may be sent such that single-carrier waveform may be maintained for an uplink transmission.

In a first design of strict SC-FDMA, HARQ feedback for multiple downlink carriers may be sent with ACK bundling. An eNB may send data transmissions on multiple downlink carriers to a UE. The UE may decode the data transmission on each downlink carrier and may obtain an ACK or NACK for the data transmission. For ACK bundling, the ACKs and/or NACKs for all data transmissions may be combined (e.g., with a logical AND operation) to obtain a single ACK or NACK, which may be referred to as a bundled ACK or NACK. In particular, a bundled ACK may be generated for all data transmissions if ACKs are obtained for all data transmissions, and a bundled NACK may be generated if NACK is obtained for any data transmission. The UE may send HARQ feedback comprising the bundled ACK or NACK on a single ACK resource. This ACK resource may be determined based on a specific rule, e.g., the first CCE of the lowest downlink carrier used for DCI carrying a downlink grant for the UE. The eNB may resend all data transmissions if a bundled NACK is received and may terminate all data transmissions if a bundled ACK is received.

In a second design of strict SC-FDMA, HARQ feedback for multiple downlink carriers may be sent using PUCCH format 2 shown in Table 1. For PUCCH format 2, up to twenty bits may be sent on a pair of resource blocks in one subframe. This may be achieved by mapping the twenty bits to ten QPSK modulation symbols and modulating a reference signal sequence with each of the ten modulation symbols to generate ten data sequences. Five data sequences may be sent in five symbol periods of a first resource block, and the remaining five data sequences may be sent in five symbol periods of a second resource block. Twenty bits can accommodate a number of ACKs/NACKs for HARQ feedback.

In one design, a separate frequency region in the control section may be used to send HARQ feedback using PUCCH format 2. This separate frequency region may be specified by an offset from either a frequency region normally used for HARQ feedback or a UE-specific frequency location. This separate frequency region may be conveyed to a UE via RRC signaling or some other means. Several UEs may share the same frequency region for sending HARQ feedback using PUCCH format 2 in order to reduce overhead. These UEs would not be scheduled for data transmission on the downlink at the same time to avoid multiple UEs using the same frequency region for HARQ feedback. A UE may send HARQ feedback either (i) on normal ACK resource using PUCCH format 1a or 1b or (ii) in the separate frequency region using PUCCH format 2, depending on the number of ACKs/NACKs to send.

In a third design of strict SC-FDMA, HARQ feedback for multiple downlink carriers may be sent using PUCCH format 1b shown in Table 1. For PUCCH format 1b, two bits may be sent on a pair of resource blocks with one reference signal sequence and one orthogonal sequence, as described above for FIG. 3. More than two bits may be sent in several manners.

In one design, more than two bits may be sent using PUCCH format 1b by removing orthogonal spreading. In this design, a UE may be assigned a reference signal sequence for sending HARQ feedback. The UE may send up to 16 bits of HARQ feedback by mapping these 16 bits to eight QPSK modulation symbols, modulating the reference signal sequence with each of the eight modulation symbols to generate eight data sequences, and sending the eight data sequences in eight symbol periods of two resource blocks. In one design, the reference signal sequence assigned to the UE may be determined based on (i) the first CCE in the lowest downlink carrier used for DCI carrying a per-carrier downlink grant for the UE or (ii) the first CCE used for DCI carrying a multi-carrier downlink grant for the UE.

A scheduler may ensure that a reference signal sequence reserved for the UE to send HARQ feedback without orthogonal spreading is not assigned to another UE for sending HARQ feedback in the same resource block. This may be achieved by sending DCI for another UE on a first CCE that does not map to the reserved reference signal sequence. CCEs that map to the reserved reference signal sequence may be used to send DCIs for other UEs, but not as the first CCE. Alternatively, a CCE structure may be defined with certain CCEs mapping to the same reference signal sequence. In this case, a multi-carrier downlink grant or multiple per-carrier downlink grants may be sent to the UE on the CCEs, and the reference signal sequence mapped to these CCEs may be used to send HARQ feedback without orthogonal spreading.

When orthogonal spreading is removed, the reference signal sequences may experience undesirable correlation properties in non-flat fading channels. This effect may be mitigated by ensuring that the reference signal sequence used to send HARQ feedback without orthogonal spreading has certain cyclic shift gaps to other reference signal sequences used to send HARQ feedback in the same resource block.

In another design, more than two bits may be sent using PUCCH format 1b by reducing orthogonal spreading with an orthogonal sequence of length two instead of four. In this design, two UEs may be assigned the same reference signal sequence but different orthogonal sequences of length two for sending HARQ feedback. Each UE may send up to eight bits of HARQ feedback by mapping these eight bits to four QPSK modulation symbols, modulating and spreading each modulation symbol to generate two data sequences, and sending eight data sequences for the four modulation symbols in eight symbol periods of two resource blocks. In one design, the reference signal sequence and the orthogonal sequence assigned to a UE may be determined based on (i) the first CCE in the lowest downlink carrier used for DCI carrying a per-carrier downlink grant for the UE or (ii) the first CCE used for DCI carrying a multi-carrier downlink grant for the UE.

A scheduler may reserve a reference signal sequence and a short orthogonal sequence for a UE to send HARQ feedback with reduced orthogonal spreading. This short orthogonal sequence of length two may correspond to two normal orthogonal sequences of length four. The scheduler may ensure that the reference signal sequence and the two normal orthogonal sequences reserved for the UE are not assigned to another UE for sending HARQ feedback on the same resource block. This may be achieved by sending DCI for another UE on a first CCE that does not map to the reserved reference signal sequence and normal orthogonal sequences. CCEs that map to the reserved reference signal sequence and normal orthogonal sequences may be used to send DCIs for other UEs, but not as the first CCEs.

Figure 6:
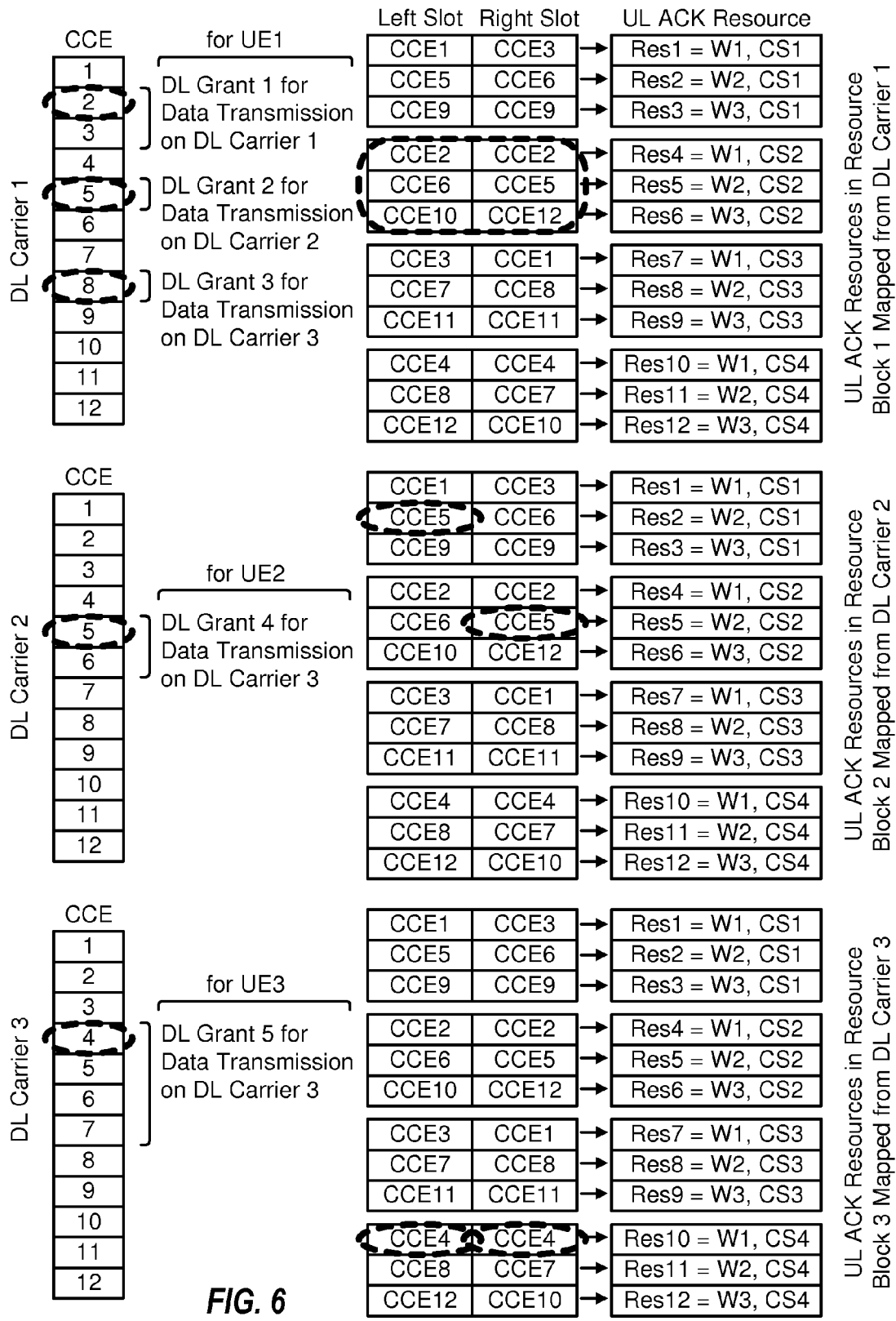
FIG. 6 shows transmission of feedback information with strict SC-FDMA.

FIG. 6 shows a design of sending HARQ feedback with strict SC-FDMA. In the example shown in FIG. 6, three downlink carriers may be used to send downlink grants and data transmissions, and one uplink carrier may be used to send HARQ feedback. Each downlink carrier may include 12 CCEs, and 36 total CCEs for the three downlink carriers may be mapped to 36 ACK indices. Each CCE may be mapped to one ACK resource in the left slot and one ACK resource in the right slot of a subframe, as shown in FIG. 6.

In the example shown in FIG. 6, UE 1 is scheduled for data transmissions on all three downlink carriers. DCI carrying downlink grant 1 for UE 1 is sent in CCEs 2 and 3 of downlink carrier 1, another DCI carrying downlink grant 2 for UE 1 is sent in CCE 5 of downlink carrier 1, and yet another DCI carrying downlink grant 3 for UE 1 is sent in CCE 8 of downlink carrier 1. Downlink grants 1, 2 and 3 convey parameters for data transmissions on downlink carriers 1, 2 and 3, respectively. UE 1 sends HARQ feedback for the data transmissions on the three downlink carriers with relaxed SC-FDMA using PUCCH format 1b and no orthogonal spreading. UE 1 is assigned reference signal sequence CS2, which is mapped to the first CCE2 used for DCI carrying downlink grant 1. UE 1 sends HARQ feedback for all three downlink carriers using reference signal sequence CS2 and no orthogonal spreading.

Reference signal sequence CS2 is used for ACK resources Res4, Res5 and Res6 that map to CCEs 2, 6 and 10 in the left slot and to CCEs 2, 5 and 12 in the right slot. CCEs 5, 6, 10 and 12 may not be used as the first CCE for DCI for another UE to avoid another UE using reference signal sequence CS2 in either slot. However, CCEs 5, 6, 10 and 12 may be used as non-starting CCEs for DCIs. For example, another DCI may be sent in CCEs 4, 5 and 6.

In one design, a decision on whether to send HARQ feedback without orthogonal spreading or with reduced orthogonal spreading may be dependent on the number of ACKs/NACKs to send by a UE. For example, reduced orthogonal spreading may be used if four or fewer ACKs/NACKs are to be sent, and no orthogonal spreading may be used if more than four ACKs/NACKs are to be sent.

For both relaxed SC-FDMA and strict SC-FDMA, a number of UEs may send HARQ feedback on the same resource block by using different reference signal sequences and possibly different orthogonal sequences. To reduce interference between the UEs sharing the same resource block, one or more reference signal sequences may be removed. This may be especially desirable to reduce interference to a UE sending HARQ feedback without orthogonal spreading or with reduced orthogonal spreading.

As noted above, a UE may send both HARQ feedback and data in a given slot. In one design, the UE may send both HARQ feedback and data on the PUSCH based on strict SC-FDMA. In another design, the UE may send data on the PUSCH and may also send HARQ feedback on the PUCCH based on relaxed SC-FDMA. The UE may also send HARQ feedback and data in other manners.

In another design, HARQ feedback for multiple downlink carriers may be sent on at least one uplink carrier with channel selection. A UE may be assigned multiple (S) pairs of ACK resources in a subframe, with each pair including one ACK resource in each slot of the subframe. The S pairs of ACK resources may be associated with S CCEs used to send one or more downlink grants for the UE (e.g., as shown in FIG. 5 or 6) or may be determined in other manners. The UE may have B ACKs/NACKs to send for data transmissions on multiple downlink carriers. The B ACKs/NACKs may be for (i) B transport blocks sent on B downlink carriers, one transport block per downlink carrier, or (ii) B transport blocks sent on B/2 downlink carriers with multiple-input multiple-output (MIMO), two transport blocks per downlink carrier, or (iii) B transport blocks sent on one or more downlink carriers in other manners. For MIMO, P transport blocks may be sent simultaneously on P layers, one transport block per layer, where P may be equal to 1, 2, etc. The P layers may be formed with a precoding matrix applied to data by an eNB prior to transmission of the data on the downlink.

In one design of ACK transmission with channel selection, the UE may select one of the S pairs of ACK resources as well as a particular signal value to send on the selected pair of ACK resources based on the B ACKs/NACKs to send by the UE. In one design, a mapping table with $2^B$ entries may be defined, one entry for each of the $2^B$ possible combinations of the B ACKs/NACKs. For example, a first entry in the mapping table may be for a combination of B ACKs, a second entry may be for a combination of B−1 ACKs followed by a NACK, a third entry may be for a combination of B−2 ACKs, followed by a NACK, followed by an ACK, etc. Each entry of the mapping table may be associated with a specific pair of ACK resources to use (from among the S pairs of ACK resources) and a specific signal value to send on this pair of ACK resources.

Table 2 shows an exemplary mapping table for mapping B ACKs/NACKs to an ACK resource and a signal value. In general, each combination of ACKs/NACKs may be mapped to any suitable combination of ACK resource and signal value.

TABLE 2

Mapping Table

| ACKs/NACKs | | | | ACK Resource | Signal Value |
|---|---|---|---|---|---|
| ACK | ACK | ... ACK | ACK | Resource 1 | Value x |
| ACK | ACK | ... ACK | NACK | Resource 2 | Value y |
| ACK | ACK | ... NACK | ACK | Resource 3 | Value x |
| . | . | . . | . | . | . |
| . | . | . . | . | . | . |
| . | . | . . | . | . | . |
| NACK | NACK | ... NACK | NACK | Resource S | Value y |

As an example, ten transport blocks may be sent on five downlink carriers with MIMO, two transport blocks per downlink carrier. Five pairs of ACK resources may be assigned to the UE. A mapping table with $2^{10}=1024$ entries may be defined, one entry for each of the 1024 possible combination of the ten ACKs/NACKs. Each entry in the mapping table may be associated with one of the five pairs of ACK resources as well as a specific 2-bit value to send on this pair of ACK resources. The UE may send ten ACKs/NACKs for the ten transport blocks by (i) looking up the mapping table with the specific combination of ACKs/NACKs to send, (ii) determining which pair of ACK resources and which signal value to use, and (iii) sending the signal value on this pair of ACK resources.

The S pairs of ACK resources may be considered as S channels for ACK information. Channel selection refers to the selection of a particular pair of ACK resources or channel on which to send ACK information. Channel selection may enable transmission of more ACKs/NACKs for a given number of ACK resources, e.g., using only one channel. This may be achieved by mapping multiple combinations of ACKs/NACKs (which may be likely to be mutually exclusive) to the same combination of channel and signal value. Channel selection may also avoid the use of all S channels at the same time, which may require more transmit power and more power amplifier (PA) back-off since a single-carrier waveform is not preserved.

In one design, channel selection may be used with orthogonal spreading. For the design shown in FIG. 3, a single ACK/NACK or two ACKs/NACKs may be mapped to a single modulation symbol d(0) based on BPSK or QPSK, respectively. This modulation symbol may be spread with orthogonal sequence w(i) of length four as shown in equation (2) and transmitted on each of a pair of ACK resources. Up to four combinations of ACKs/NACKs may be supported with one modulation symbol for ACK information sent with orthogonal spreading.

In another design, channel selection may be used without orthogonal spreading. Up to eight modulation symbols may be sent on a pair of ACK resources by removing the orthogonal spreading, as described above. More combinations of ACKs/NACKs may be supported by a pair of ACK resources by removing the orthogonal spreading.

In yet another design, channel selection may be used with reduced orthogonal spreading. Up to four modulation symbols may be sent on a pair of ACK resources by spreading with an orthogonal sequence of length two, as described above. More combinations of ACKs/NACKs may be supported by a pair of ACK resources by reducing the orthogonal spreading.

In one design, channel selection may be used without bundling, as described above. In this case, the UE may generate one ACK/NACK for each transport block received on the downlink. In another design, channel selection may be used with bundling, which may be performed in various manners. In one design of bundling, the UE may bundle ACKs/NACKs for all transport blocks sent with MIMO on each downlink carrier and may obtain one bundled ACK/NACK for each downlink carrier. In another design, the UE may bundle ACKs/NACKs for all transport blocks sent on all downlink carriers for each layer and may obtain one bundled ACK/NACK for each layer. The bundled ACKs/NACKs for all downlink carriers or layers may then be sent with channel selection in similar manner as regular ACKs/NACKs.

As shown in FIG. 3, a UE may send ACK information in two slots of a subframe. The UE may encode and send the ACK information in various manners. In one design, the UE may send the ACK information with repetition across the two slots of a subframe. The UE may generate C code bits for the ACK information, where C≥1, send the C code bits on one resource block in the left slot, and send the same C code bits on another resource block in the right slot. The UE may thus send the same C code bits with repetition in the two slots of a subframe. In another design, the UE may send the ACK information with joint coding across the two slots of a subframe. The UE may generate 2C code bits for the ACK information, send the first C code bits on one resource block in the left slot, and send the remaining C code bits on another resource block in the right slot. The UE may send the ACK information with either repetition or joint coding for each of the designs described above. The UE may also send the ACK information in other manners.

Figure 7:
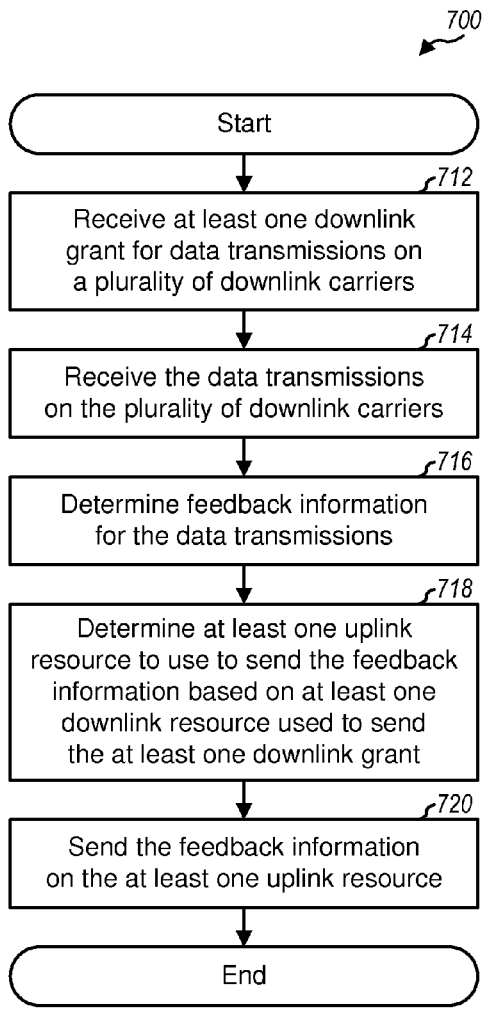
FIGS. 7 and 8 show a process and an apparatus, respectively, for sending feedback information.

FIG. 7 shows a design of a process 700 for sending feedback information in a wireless communication system. Process 700 may be performed by a UE (as described below) or by some other entity. The UE may receive at least one downlink grant for data transmissions on a plurality of downlink carriers (block 712). The UE may receive the data transmissions on the plurality of downlink carriers (block 714) and may determine feedback information for the data transmissions (block 716). The feedback information may comprise ACK information and/or other information. The UE may also determine at least one uplink resource to use to send the feedback information based on at least one downlink resource used to send the at least one downlink grant (block 718). The UE may then send the feedback information on the at least one uplink resource (block 720).

In one design, the UE may receive a plurality of downlink grants for the data transmissions on the plurality of downlink carriers, one downlink grant for the data transmission on each downlink carrier. The UE may receive each downlink grant on (i) a different one of the plurality of downlink carriers or (ii) any one of the plurality of downlink carriers. The UE may determine an uplink resource to use to send the feedback information for the data transmission on each downlink carrier based on the first CCE used to send the downlink grant for the data transmission on that downlink carrier. In one design, each downlink carrier may be associated with a set of CCEs, and the CCEs for the plurality of downlink carriers may be assigned unique indices based on common CCE numbering across the plurality of downlink carriers.

In another design, the UE may receive a single downlink grant for the data transmissions on the plurality of downlink carriers. The UE may determine the at least one uplink resource based on the first CCE used to send the single downlink grant. In one design, the UE may determine an uplink resource to use to send the feedback information for the data transmission on each downlink carrier based on the first CCE used to send the single downlink grant and the downlink carrier used to send the data transmission. In another design, the plurality of downlink carriers may be associated with a plurality of CCEs starting with the first CCE. The UE may determine an uplink resource to use to send the feedback information for the data transmission on each downlink carrier based on the CCE associated with the downlink carrier used to send the data transmission. In one design, an uplink resource used to send the feedback information for the data transmission on each downlink carrier may comprise a frequency region or resource block on an uplink carrier, an orthogonal sequence, and a reference signal sequence. The frequency region or resource block may be determined based on the downlink carrier used for the data transmission. The orthogonal sequence and the reference signal sequence may be determined based on the first CCE used to send the single downlink grant.

Figure 8:
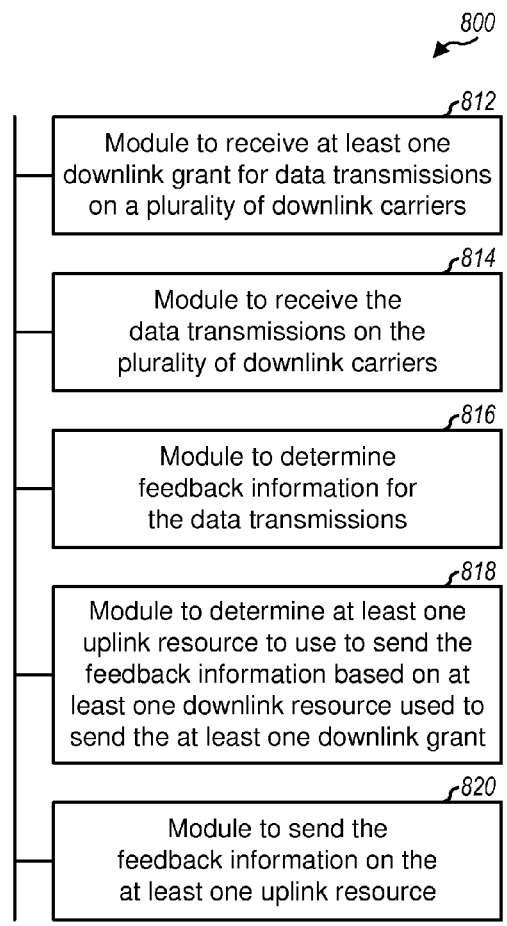

FIG. 8 shows a design of an apparatus 800 for sending feedback information in a wireless communication system. Apparatus 800 includes a module 812 to receive at least one downlink grant for data transmissions on a plurality of downlink carriers, a module 814 to receive the data transmissions on the plurality of downlink carriers, a module 816 to determine feedback information for the data transmissions, a module 818 to determine at least one uplink resource to use to send the feedback information based on at least one downlink resource used to send the at least one downlink grant, and a module 820 to send the feedback information on the at least one uplink resource.

FIG. 9 shows a design of a process 900 for receiving feedback information in a wireless communication system. Process 900 may be performed by a base station/eNB (as described below) or by some other entity. The base station may send at least one downlink grant for data transmissions on a plurality of downlink carriers (block 912). The base station may send the data transmissions on the plurality of downlink carriers (block 914). The base station may determine at least one uplink resource used to send feedback information (e.g., ACK information) for the data transmissions based on at least one downlink resource used to send the at least one downlink grant (block 916). The base station may receive the feedback information on the at least one uplink resource (block 918).

In one design, the base station may send a plurality of downlink grants for the data transmissions on the plurality of downlink carriers, one downlink grant for data transmission on each downlink carrier. The base station may determine an uplink resource used to send feedback information for the data transmission on each downlink carrier based on the first CCE used to send the downlink grant for the data transmission on that downlink carrier. In another design, the base station may send a single downlink grant for the data transmissions on the plurality of downlink carriers. The base station may determine the at least one uplink resource based on the first CCE used to send the single downlink grant.

FIG. 10 shows a design of an apparatus 1000 for receiving feedback information in a wireless communication system. Apparatus 1000 includes a module 1012 to send at least one downlink grant for data transmissions on a plurality of downlink carriers, a module 1014 to send the data transmissions on the plurality of downlink carriers, a module 1016 to determine at least one uplink resource used to send feedback information for the data transmissions based on at least one downlink resource used to send the at least one downlink grant, and a module 1018 to receive the feedback information on the at least one uplink resource.

Figure 11:
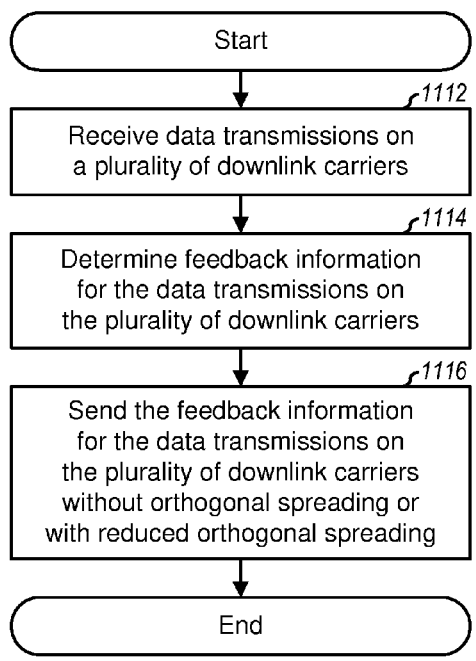
FIGS. 11 and 12 show a process and an apparatus, respectively, for sending feedback information with reduced or no orthogonal spreading.

FIG. 11 shows a design of a process 1100 for sending feedback information with reduced or no orthogonal spreading. Process 1100 may be performed by a UE (as described below) or by some other entity. The UE may receive data transmissions on a plurality of downlink carriers (block 1112). The UE may determine first feedback information (e.g., ACK information) for the data transmissions on the plurality of downlink carriers (block 1114). The UE may send the first feedback information for the data transmissions on the plurality of downlink carriers without orthogonal spreading or with reduced orthogonal spreading using an orthogonal sequence of a first length (block 1116). Second feedback information for data transmission on a single downlink carrier may normally be sent (e.g., by another UE) with orthogonal spreading using an orthogonal sequence of a second length longer than the first length. The UE may determine whether to send the first feedback information without orthogonal spreading or with reduced orthogonal spreading based on the amount of first feedback information to send.

In one design, the UE may determine a reference signal sequence assigned to the UE based on the first CCE used to send a downlink grant to the UE. The UE may then send the first feedback information on at least one uplink resource using the reference signal sequence without orthogonal spreading. No other UEs may be assigned the reference signal sequence for sending feedback information on the at least one uplink resource.

In one design, the first feedback information may be sent without orthogonal spreading in a first frequency region. The second feedback information may be sent with orthogonal spreading in a second frequency region different from the first frequency region. In one design, the first feedback information may be mapped to the first frequency region based on upper layer signaling. The second feedback information may be mapped to the second frequency region based on the first CCE used to send a downlink grant.

In one design, the UE may send feedback information using orthogonal spreading of different lengths. For example, the UE may send a first subset of the first feedback information with reduced orthogonal spreading using the orthogonal sequence of the second length. The UE may send a second subset of the first feedback information with orthogonal spreading using an orthogonal sequence of a third length different from the second length.

Figure 12:
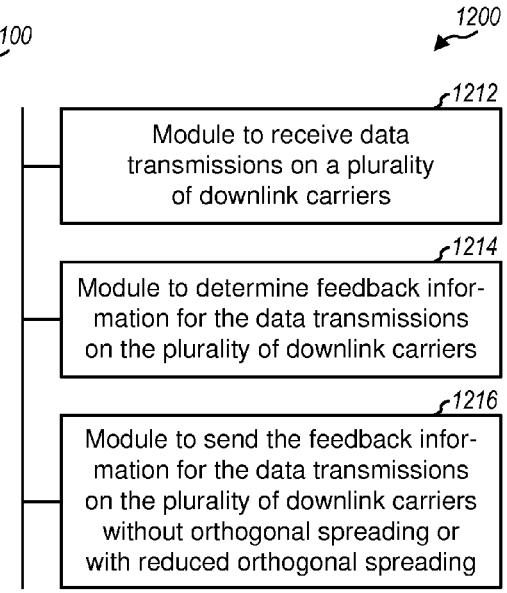

FIG. 12 shows a design of an apparatus 1200 for sending feedback information with reduced or no orthogonal spreading. Apparatus 1200 includes a module 1212 to receive data transmissions on a plurality of downlink carriers, a module 1214 to determine feedback information for the data transmissions on the plurality of downlink carriers, and a module 1216 to send the feedback information for the data transmissions on the plurality of downlink carriers without orthogonal spreading or with reduced orthogonal spreading.

Figure 13:
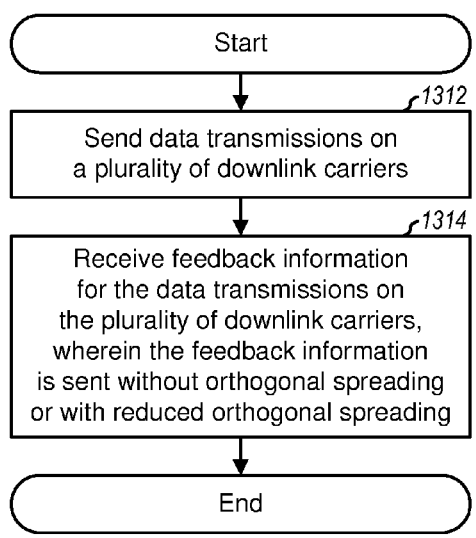
FIGS. 13 and 14 show a process and an apparatus, respectively, for receiving feedback information sent with reduced or no orthogonal spreading.

FIG. 13 shows a design of a process 1300 for receiving feedback information sent with reduced or no orthogonal spreading. Process 1300 may be performed by a base station/eNB (as described below) or by some other entity. The base station may send data transmissions on a plurality of downlink carriers to a UE (block 1312). The base station may receive first feedback information (e.g., ACK information) for the data transmissions on the plurality of downlink carriers from the UE (block 1314). The first feedback information may be sent by the UE without orthogonal spreading or with reduced orthogonal spreading using an orthogonal sequence of a first length. Second feedback information for data transmission on a single downlink carrier may normally be sent (e.g., by another UE) with orthogonal spreading using an orthogonal sequence of a second length longer than the first length.

In one design, the base station may assign a reference signal sequence to the UE based on the first CCE used to send a downlink grant to the UE. The first feedback information may be sent on at least one uplink resource using the reference signal sequence without orthogonal spreading. No other UEs may be assigned the reference signal sequence for sending feedback information on the at least one uplink resource.

In one design, the first feedback information may be sent without orthogonal spreading in a first frequency region. The second feedback information may be sent with orthogonal spreading in a second frequency region different from the first frequency region. In one design, the first feedback information may be mapped to the first frequency region based on upper layer signaling. The second feedback information may be mapped to the second frequency region based on the first CCE used to send a downlink grant.

In one design, the feedback information may be sent using orthogonal spreading of different lengths. For example, a first subset of the first feedback information may be sent with reduced orthogonal spreading using the orthogonal sequence of the second length. A second subset of the first feedback information may be sent with orthogonal spreading using an orthogonal sequence of a third length different from the second length.

Figure 14:
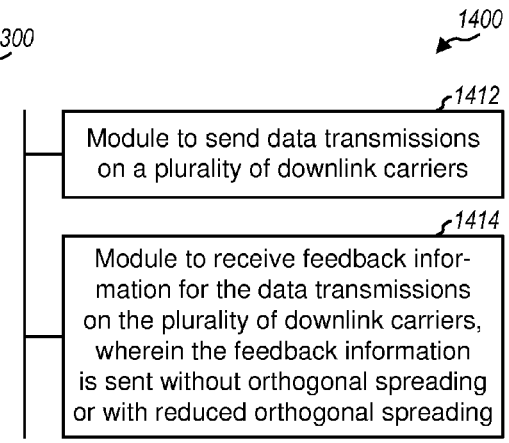

FIG. 14 shows a design of an apparatus 1400 for receiving feedback information sent with reduced or no orthogonal spreading. Apparatus 1400 includes a module 1412 to send data transmissions on a plurality of downlink carriers, and a module 1414 to receive feedback information for the data transmissions on the plurality of downlink carriers, wherein the feedback information is sent without orthogonal spreading or with reduced orthogonal spreading.

Figure 15:
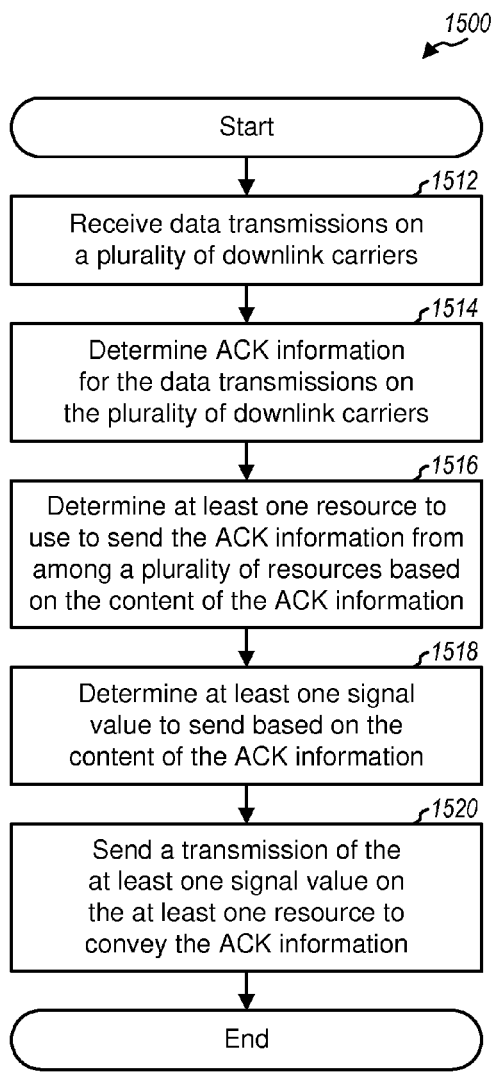
FIGS. 15 and 16 show a process and an apparatus, respectively, for sending feedback information with channel selection.

FIG. 15 shows a design of a process 1500 for sending feedback information with channel selection. Process 1500 may be performed by a UE (as described below) or by some other entity. The UE may receive data transmissions on a plurality of downlink carriers (block 1512). The UE may determine ACK information (e.g., ACKs and/or NACKs) for the data transmissions on the plurality of downlink carriers (block 1514). The UE may determine at least one resource to use to send the ACK information from among a plurality of resources (or channels) based on the content of the ACK information, e.g., using a mapping table (block 1516). Each of the plurality of resources may correspond to a resource block, or an orthogonal sequence, or a reference signal sequence, or some other type of resource, or a combination thereof. The UE may also determine at least one signal value to send on the at least one resource based on the content of the ACK information (block 1518). The UE may send a transmission of the at least one signal value on the at least one resource to convey the ACK information (block 1520).

In one design, the UE may send the ACK information with orthogonal spreading. In another design, the UE may send the ACK information without orthogonal spreading. In yet another design, the UE may send the ACK information with reduced orthogonal spreading using an orthogonal sequence of a length less than four.

In one design, the UE may perform bundling across layers for each of the plurality of downlink carriers. The UE may determine a bundled ACK or NACK for each downlink carrier based on ACKs/NACKs for multiple transport blocks received on that downlink carrier. The UE may then determine the at least one resource and the at least one signal value based on the bundled ACK or NACK for each of the plurality of downlink carriers.

In another design, the UE may perform bundling across downlink carriers for each of a plurality of layers. The UE may determine a bundled ACK or NACK for each layer based on ACKs/NACKs for multiple transport blocks received via that layer on the plurality of downlink carriers. The UE may then determine the at least one resource and the at least one signal value based on the bundled ACK or NACK for each of the plurality of layers.

Figure 16:
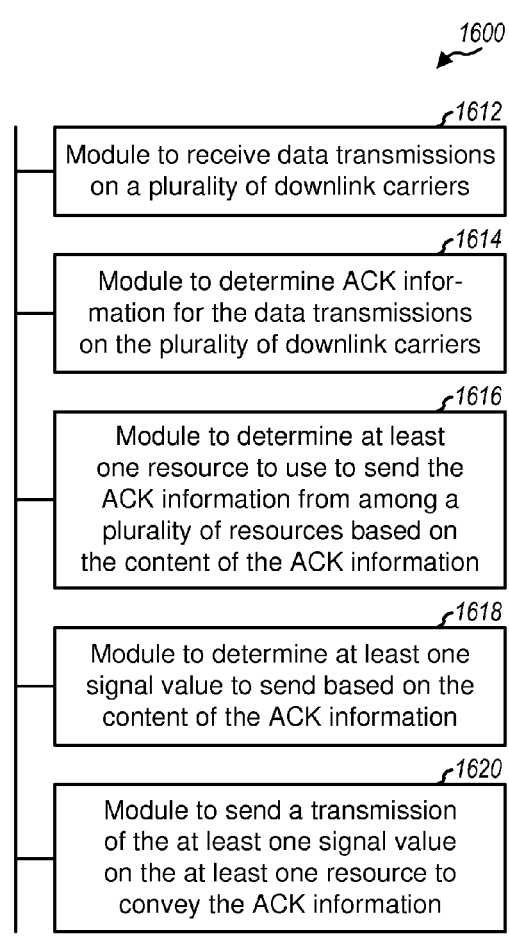

FIG. 16 shows a design of an apparatus 1600 for sending feedback information with channel selection. Apparatus 1600 includes a module 1212 to receive data transmissions on a plurality of downlink carriers, a module 1214 to determine ACK information for the data transmissions on the plurality of downlink carriers, a module 1216 to determine at least one resource to use to send the ACK information from among a plurality of resources based on the content of the ACK information, a module 1218 to determine at least one signal value to send based on the content of the ACK information, and a module 1220 to send a transmission of the at least one signal value on the at least one resource to convey the ACK information.

Figures 17, 18:
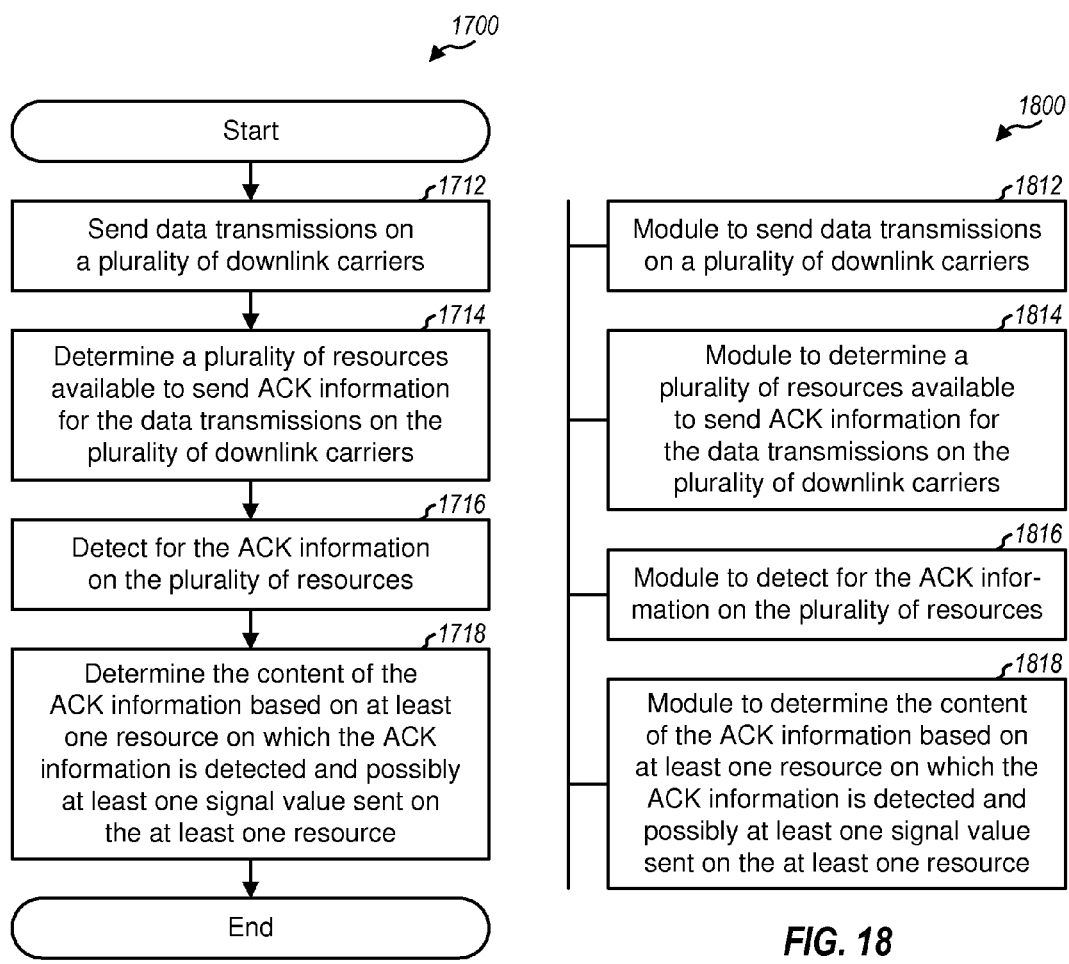
FIGS. 17 and 18 show a process and an apparatus, respectively, for receiving feedback information sent with channel selection.

FIG. 17 shows a design of a process 1700 for receiving feedback information sent with channel selection. Process 1700 may be performed by a base station/eNB (as described below) or by some other entity. The base station may send data transmissions on a plurality of downlink carriers (block 1712). The base station may determine a plurality of resources (or channels) available to send ACK information for the data transmissions on the plurality of downlink carriers (block 1714). The base station may detect for the ACK information on the plurality of resources (block 1716). The base station may determine the content of the ACK information based on at least one resource on which the ACK information is detected and possibly at least one signal value sent on the at least one resource (block 1718).

The ACK information may be sent with orthogonal spreading using an orthogonal sequence of length four, or without orthogonal spreading, or with reduced orthogonal spreading using an orthogonal sequence of length less than four. The base station may perform the complementary despreading if the ACK information is sent with orthogonal spreading.

In one design, bundling is performed across layers for each downlink carrier. The base station may obtain a bundled ACK or NACK for each of the plurality of downlink carriers based on the content of the ACK information. The bundled ACK or NACK for each downlink carrier may be generated based on ACKs/NACKs for multiple transport blocks sent on the downlink carrier.

In another design, bundling may be performed across downlink carriers for each layer. The base station may obtain a bundled ACK or NACK for each of a plurality of layers based on the content of the ACK information. The bundled ACK or NACK for each layer may be generated based on ACKs/NACKs for multiple transport blocks sent via the layer on the plurality of downlink carriers.

FIG. 18 shows a design of an apparatus 1800 for receiving feedback information sent with channel selection. Apparatus 1800 includes a module 1812 to send data transmissions on a plurality of downlink carriers, a module 1814 to determine a plurality of resources available to send ACK information for the data transmissions on the plurality of downlink carriers, a module 1816 to detect for the ACK information on the plurality of resources, and a module 1818 to determine the content of the ACK information based on at least one resource on which the ACK information is detected and possibly at least one signal value sent on the at least one resource.

The modules in FIGS. 8, 10, 12, 14, 16 and 18 may comprise processors, electronic devices, hardware devices, electronic components, logical circuits, memories, software codes, firmware codes, etc., or any combination thereof.

Figure 19:
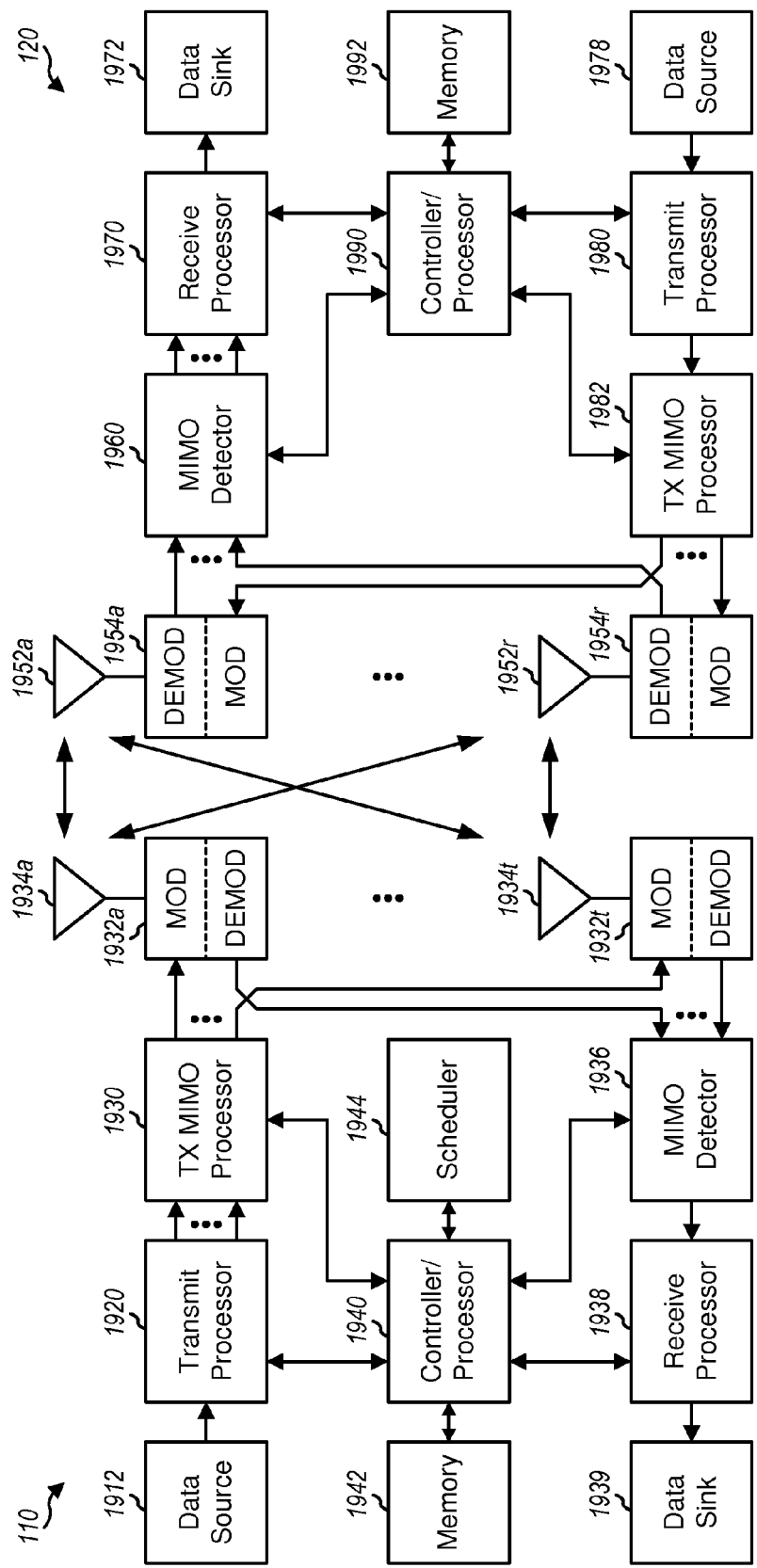
FIG. 19 shows a block diagram of a base station and a UE.

FIG. 19 shows a block diagram of a design of a base station/eNB 110 and a UE 120, which may be one of the base stations/eNBs and one of the UEs in FIG. 1. Base station 110 may be equipped with T antennas 1934a through 1934t, and UE 120 may be equipped with R antennas 1952a through 1952r, where in general $T \geq 1$ and $R \geq 1$.

At base station 110, a transmit processor 1920 may receive data from a data source 1912 for one or more UEs, process (e.g., encode and modulate) the data for each UE based on one or more modulation and coding schemes selected for that UE, and provide data symbols for all UE. Transmit processor 1920 may also process control information (e.g., downlink grants, RRC signaling, etc.) and provide control symbols. A TX MIMO processor 1930 may precode the data symbols, the control symbols, and/or reference symbols (if applicable) and may provide T output symbol streams to T modulators (MOD) 1932a through 1932t. Each modulator 1932 may process its output symbol stream (e.g., for OFDM) to obtain an output sample stream. Each modulator 1932 may further condition (e.g., convert to analog, filter, amplify, and upconvert) its output sample stream and generate a downlink signal. T downlink signals from modulators 1932a through 1932t may be transmitted via T antennas 1934a through 1934t, respectively.

At UE 120, R antennas 1952a through 1952r may receive the T downlink signals from eNB 110, and each antenna 1952 may provide a received signal to an associated demodulator (DEMOD) 1954. Each demodulator 1954 may condition (e.g., filter, amplify, downconvert, and digitize) its received signal to obtain samples and may further process the samples (e.g., for OFDM) to obtain received symbols. A MIMO detector 1960 may obtain received symbols from all demodulators 1954, perform MIMO detection on the received symbols if applicable, and provide detected symbols. A receive processor 1970 may process (e.g., demodulate and decode) the detected symbols, provide decoded data for UE 120 to a data sink 1972, and provide decoded control information to a controller/processor 1990.

On the uplink, at UE 120, data from a data source 1978 and control information (e.g., feedback information such as ACK information, CQI information, etc.) from controller/processor 1990 may be processed by a transmit processor 1980, precoded by a TX MIMO processor 1982 if applicable, further processed by modulators 1954a through 1954r, and transmitted to base station 110. At base station 110, the uplink signals from UE 120 may be received by antennas 1934, processed by demodulators 1932, detected by a MIMO detector 1936 if applicable, and further processed by a receive processor 1938 to recover the data and control information sent by UE 120. The recovered data may be provided to a data sink 1939, and the recovered control information may be provided to controller/processor 1940.

Controllers/processors 1940 and 1990 may direct the operation at base station 110 and UE 120, respectively. Processor 1990 and/or other processors and modules at UE 120 may perform or direct process 700 in FIG. 7, process 1100 in FIG. 11, process 1500 in FIG. 15, and/or other processes for the techniques described herein. Processor 1940 and/or other processors and modules at base station 110 may perform or direct process 900 in FIG. 9, process 1300 in FIG. 13, process 1700 in FIG. 17, and/or other processes for the techniques described herein. Memories 1942 and 1992 may store data and program codes for base station 110 and UE 120, respectively. A scheduler 1944 may schedule UE 120 and/or other UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving data transmissions on a plurality of downlink carriers;
determining a plurality of uplink resources for acknowledgement (ACK) information based at least in part on a mapping between the plurality of uplink resources and downlink control information received on a carrier of the plurality of downlink carriers;
determining ACK information for the data transmissions on the plurality of downlink carriers;
selecting at least one resource to use to send the ACK information from among the plurality of uplink resources based on content of the ACK information associated with each downlink carrier of the plurality of downlink carriers;
determining at least one signal value to send on the at least one uplink resource based on the content of the ACK information associated with each downlink carrier of the plurality of downlink carriers; and
sending a transmission comprising the signal value on the at least one uplink resource to convey the ACK information.

2. The method of claim 1, further comprising:
determining a bundled ACK or NACK for each of the plurality of downlink carriers based on ACKs/NACKs for multiple transport blocks received on the downlink carrier, and wherein the determining the at least one resource comprises determining the at least one resource based on the bundled ACK or NACK for each of the plurality of downlink carriers.

3. The method of claim 1, further comprising:
determining a bundled ACK or NACK for each of a plurality of layers based on ACKs/NACKs for multiple transport blocks received via the layer on the plurality of downlink carriers, and wherein the determining the at least one resource comprises determining the at least one resource based on the bundled ACK or NACK for each of the plurality of layers.

4. The method of claim 1, wherein the sending the transmission comprises sending the transmission without orthogonal spreading or with reduced orthogonal spreading using an orthogonal sequence of a length less than four.

5. The method of claim 1, wherein each of the plurality of resources corresponds to a resource block, or an orthogonal sequence, or a reference signal sequence, or a combination thereof.

6. An apparatus for wireless communication, comprising:
a processor; and
memory in electronic communication with the processor; wherein the memory stores instructions executable by the processor to:
receive data transmissions on a plurality of downlink carriers;
determine a plurality of uplink resources for acknowledgement (ACK) information based at least in part on a mapping between the plurality of uplink resources and downlink control information received on a carrier of the plurality of downlink carriers;
determine ACK information for the data transmissions on the plurality of downlink carriers;
select at least one resource to use to send the ACK information from among the plurality of uplink resources based on content of the ACK information associated with each downlink carrier of the plurality of downlink carriers;
determine at least one signal value to send on the at least one uplink resource based on the content of the ACK information associated with each downlink carrier of the plurality of downlink carriers; and
send a transmission comprising the signal value on the at least one uplink resource to convey the ACK information.

7. The apparatus of claim 6, further comprising instructions executable by the processor to:
determine a bundled ACK or NACK for each of the plurality of downlink carriers based on ACKs/NACKs for multiple transport blocks received on the downlink carrier, and wherein the means for determining the at least one resource comprises means for determining the at least one resource based on the bundled ACK or NACK for each of the plurality of downlink carriers.

8. The apparatus of claim 6, further comprising instructions executable by the processor to:
determine a bundled ACK or NACK for each of a plurality of layers based on ACKs/NACKs for multiple transport blocks received via the layer on the plurality of downlink carriers, and wherein the means for determining the at least one resource comprises means for determining the at least one resource based on the bundled ACK or NACK for each of the plurality of layers.

9. A method for wireless communication, comprising:
sending data transmissions on a plurality of downlink carriers;
determining a plurality of resources available to send acknowledgement (ACK) information based at least in part on a mapping between the plurality of uplink resources and downlink control information sent on a carrier of the plurality of downlink carriers;
detecting for the ACK information on the plurality of resources;
determining at least one signal value sent on the at least one resource; and
determining content of the ACK information based on at least one resource on which the ACK information is detected and the signal value.

10. The method of claim 9, further comprising:
obtaining a bundled ACK or NACK for each of the plurality of downlink carriers based on the content of the ACK information, wherein the bundled ACK or NACK for each downlink carrier is generated based on ACKs/NACKs for multiple transport blocks sent on the downlink carrier.

11. The method of claim 9, further comprising:
obtaining a bundled ACK or NACK for each of a plurality of layers based on the content of the ACK information, wherein the bundled ACK or NACK for each layer is generated based on ACKs/NACKs for multiple transport blocks sent via the layer on the plurality of downlink carriers.

12. The method of claim 9, wherein the ACK information is sent without orthogonal spreading or with reduced orthogonal spreading using an orthogonal sequence of a length less than four.

13. An apparatus for wireless communication, comprising:
a processor; and
memory in electronic communication with the processor; wherein the memory stores instructions executable by the processor to:
send data transmissions on a plurality of downlink carriers;
determine a plurality of resources available to send acknowledgement (ACK) information based at least in part on a mapping between the plurality of uplink resources and downlink control information sent on a carrier of the plurality of downlink carriers;
detect for the ACK information on the plurality of resources;
determine at least one signal value sent on the at least one resource; and
determine content of the ACK information based on at least one resource on which the ACK information is detected and the signal value.

14. The apparatus of claim 13, further comprising instructions executable by the processor to:
obtain a bundled ACK or NACK for each of the plurality of downlink carriers based on the content of the ACK information, wherein the bundled ACK or NACK for each downlink carrier is generated based on ACKs/NACKs for multiple transport blocks sent on the downlink carrier.

15. The apparatus of claim 13, further comprising instructions executable by the processor to:
obtain a bundled ACK or NACK for each of a plurality of layers based on the content of the ACK information, wherein the bundled ACK or NACK for each layer is generated based on ACKs/NACKs for multiple transport blocks sent via the layer on the plurality of downlink carriers.

* * * * *